United States Patent
Vos et al.

(10) Patent No.: US 11,395,343 B2
(45) Date of Patent: Jul. 19, 2022

(54) METHOD AND APPARATUS FOR SUPPORTING TWO-STEP RANDOM ACCESS CHANNEL USAGE IN A WIRELESS COMMUNICATION SYSTEM

(71) Applicant: SIERRA WIRELESS, INC., Richmond (CA)

(72) Inventors: Gustav Gerald Vos, Surrey (CA); Recep Serkan Dost, Richmond (CA); Steven John Bennett, Coquitlam (CA)

(73) Assignee: SIERRA WIRELESS, INC., Richmond (CA)

( * ) Notice: Subject to any disclaimer, the term of this patent is extended or adjusted under 35 U.S.C. 154(b) by 149 days.

(21) Appl. No.: 16/791,956

(22) Filed: Feb. 14, 2020

(65) Prior Publication Data

US 2020/0267774 A1    Aug. 20, 2020

Related U.S. Application Data

(60) Provisional application No. 62/805,581, filed on Feb. 14, 2019.

(51) Int. Cl.
*H04W 74/08* (2009.01)
*H04L 1/18* (2006.01)
*H04L 5/00* (2006.01)

(52) U.S. Cl.
CPC ....... *H04W 74/0833* (2013.01); *H04L 1/1861* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 10,231,237 B2 * | 3/2019 | Park | H04L 1/1887 |
| 2018/0110074 A1 * | 4/2018 | Akkarakaran | H04W 72/0413 |
| 2018/0124626 A1 * | 5/2018 | Tsai | H04L 25/0202 |
| 2018/0139787 A1 * | 5/2018 | Islam | H04W 48/16 |
| 2019/0174472 A1 * | 6/2019 | Lee | H04W 72/042 |
| 2019/0208505 A1 * | 7/2019 | Park | H04W 72/0446 |
| 2019/0327762 A1 * | 10/2019 | Takeda | H04W 72/0406 |
| 2020/0059969 A1 * | 2/2020 | Agiwal | H04W 74/0833 |

(Continued)

FOREIGN PATENT DOCUMENTS

| | | |
|---|---|---|
| WO | 2018/175809 A1 | 9/2018 |
| WO | 2019/009619 A1 | 1/2019 |
| WO | 2020/163969 A1 | 8/2020 |

OTHER PUBLICATIONS

Patent Cooperation Treaty, International Search Report issued in PCT/CA2020/050202, dated Apr. 28, 2020, pp. 1-4.

(Continued)

*Primary Examiner* — Ayaz R Sheikh
*Assistant Examiner* — Faiyazkhan Ghafoerkhan
(74) *Attorney, Agent, or Firm* — Pillsbury Winthrop Shaw Pittman LLP

(57) ABSTRACT

Methods and apparatuses related to a two-step RACH procedure are provided. Channel conditions can be estimated based on a UE PRACH transmission rather than the subsequent PUSCH transmission in the first part of the two-step RACH. A variable length gap can be provided between the PRACH preamble transmission and the PUSCH transmission. Other solutions are also provided.

10 Claims, 15 Drawing Sheets

(56) References Cited

U.S. PATENT DOCUMENTS

| | | | | |
|---|---|---|---|---|
| 2020/0092842 | A1* | 3/2020 | Kim | H04W 76/10 |
| 2020/0106498 | A1* | 4/2020 | Zhou | H04B 7/0619 |
| 2020/0146069 | A1* | 5/2020 | Chen | H04W 76/11 |
| 2020/0221418 | A1* | 7/2020 | Kim | H04W 76/10 |
| 2020/0229241 | A1* | 7/2020 | Jeon | H04W 74/0833 |
| 2020/0260500 | A1* | 8/2020 | Agiwal | H04W 74/006 |
| 2021/0022109 | A1* | 1/2021 | Kim | H04W 76/10 |
| 2021/0152409 | A1* | 5/2021 | Pan | H04L 5/0048 |
| 2021/0345424 | A1* | 11/2021 | Cirik | H04W 74/02 |
| 2021/0360706 | A1* | 11/2021 | Cirik | H04W 74/0816 |

OTHER PUBLICATIONS

Patent Cooperation Treaty, Written Opinion of the International Searching Authority issued in PCT/CA2020/050202, dated Apr. 28, 2020, pp. 1-9.

3GPP, "Release 15 Description", TR21.915, V0.6.0, Feb. 4, 2019 (Feb. 4, 2019), [online] [retrieved on Apr. 15, 2020 (Apr. 15, 2020)], Retrieved from the internet: https://www.3gpp.org/ftp/Specs/archive/2 I _series/2 I .915/21915-060.zip.

3GPP, "NR; Physical channels and modulation (Release 15)", 3GPP TS 38.211 VI5.4.0, Dec. 31, 2018 (Dec. 31, 2018) (Jan. 16, 2019), [online] [retrieved on Apr. 15, 2020 (Apr. 15, 2020)], retrieved from the internet: https://www.3gpp.org/ftp/Specs/archive/38 series/38.2 I I/382 I I-f40.zip.

3GPP, "New work item: 2-step RACH for NR", 3GPP TSG RAN Meeting #82, RP-182881, Dec. 13, 2018 (Dec. 13, 2018), [online] [retrieved on Apr. 15, 2020 (Apr. 15, 2020)], retrieved from the internet: http://www.3gpp.org/ftp/tsg_ran/TSG_RAN/TSGR_82/Docs/RP-I8288I.zip.

3GPP, "Technical Specification Group Radio Access Network; NR; NR and NG-RAN Overall Description; Stage 2 (Release 15)", 3GPP TS 38.300, version 15.4.0, Dec. 31, 2018 (Dec. 31, 2018), [online] [retrieved on Apr. 15, 2020 (Apr. 15, 2020)], retrieved from the internet: https://www.3gpp.org/ftp/Specs/archive/3 8 series/3 8.300/3 8300-f 40.zip.

3GPP, "NR; Medium Access Control (MAC) protocol specification (Release 15)", 3GPP ETSI TS 138 321 V15.4.0 (Apr. 2019), [online] [retrieved on Apr. 15, 2020 (Apr. 15, 2020)], retrieved from the internet: https://www.https://cdn.standards.iteh.ai/samples/57302/9402947b17dd4e59a54971dc28cedfd0/ETSI-TS-138-321-V15-4-0-2019-04-.pdf.

R1-1609654, "Link adaptation for grant-free transmissions", Nokia, Alcatel-Lucent Shanghai Bell, 3GPP TSG-RAN WG1 #86bis, Lisbon, Portugal Oct. 10-14, 2016, pp. 1-3.

R1-1611376, "Discussion of Simplified RACH Procedures", CATT, 3GPP TSG RAN WG1 Meeting #87, Reno, USA, Nov. 14-18, 2016, pp. 1-3.

R1-1612311, "Random Access Procedure", InterDigital Communications, 3GPP TSG-RAN WG1 #87, Reno, USA, Nov. 14-18, 2016, pp. 1-4.

R1-1700300, "NR two-step random access procedure", Ericsson, 3GPP TSG-RAN WG1 NR adhoc, Spokane, USA, Jan. 16-20, 2017, pp. 1-4.

R1-1700892, "NR 2-step random access procedure", Samsung, 3GPP TSG RAN WG1 NR Ad Hoc, Spokane, Washington, USA, Jan. 16-20, 2017, pp. 1-5.

* cited by examiner

METHOD AND APPARATUS FOR SUPPORTING TWO-STEP RANDOM ACCESS CHANNEL USAGE IN A WIRELESS COMMUNICATION SYSTEM

CROSS REFERENCE TO RELATED APPLICATIONS

This application claims the benefit of priority to U.S. Patent Application Ser. No. 62/805,581 entitled "Method and Apparatus for Supporting Two-Step Random Access Channel Usage in a Wireless Communication System" filed Feb. 14, 2019, which is hereby incorporated by reference in its entirety.

FIELD OF THE INVENTION

The present invention pertains in general to wireless communications, for example following 3GPP standards, and in particular to methods and apparatuses for supporting two-step random access in a wireless communication system.

BACKGROUND

Support for two-step random access channel (RACH) utilization is under development for $3^{rd}$ Generation Partnership Project New Radio (NR) standardization. Two-step RACH is a condensed version of the LTE four-step RACH method. In the four-step RACH method, illustrated in FIG. 1, a UE transmits a message 1 on the random access channel (RACH), the message 1 including a selected one of 64 PRACH preambles. An infrastructure device (e.g. base station, radio access node or eNB/gNB) in receipt of message 1 transmits a random access response (RAR) (message 2) to the UE. The RAR may be sent on the physical downlink shared channel (PDSCH) and conveys the identity of the detected preamble along with other information such as timing information and an initial uplink resource grant for use by the UE. The UE, in receipt of the RAR, then transmits a message 3, such as a radio resource control (RRC) connect request message, using the timing information and uplink resource grant information. Message 3 may be transmitted using the physical uplink shared channel (PUSCH). Finally, the infrastructure device responds with a message 4 (e.g. on the PDSCH), such as a RRC connection setup message or contention resolution message. In the two-step RACH method, illustrated in FIG. 2, the UE transmits message 1 and message 3 together, without waiting for message 2. The infrastructure device may then respond with messages 2 and 4 together. Message 1 and message 3 may be transmitted together for example by transmitting message 1 in a first slot and transmitting message 3 in the immediately following slot.

However, the two-step RACH methods under development exhibit various problems and are subject to improvement.

Therefore there is a need for methods and apparatuses for supporting two-step RACH usage in a wireless communication system, such as an long term evolution (LTE) or NR system, that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for supporting two-step random access in a wireless communication system, such as a 5G or New Radio (NG) system. In accordance with aspects of the present invention, there is provided a method for channel estimation by a radio access network (RAN) infrastructure node, the method including receiving, as part of a two-step random access channel (RACH) access procedure, a combination of a message 1 plus a message 3 from a UE; and estimating channel conditions using characteristics of the message 1.

In some embodiments, the message 1 includes a PRACH preamble selected from a set of PRACH preambles, the message 3 includes a DMRS symbol pattern selected from a set of DMRS symbol patterns, the set of PRACH preambles having more members than the set of DMRS symbol patterns, each member of the set of DMRS symbol patterns being associated with multiple members of the set of PRACH preambles such that no two members of the set of DMRS symbols are associated with the same member of the set of PRACH preambles and the method further includes detecting a DMRS collision when: the message 1 is received concurrently with a second message 1; and the PRACH preamble of the message 1 and a second PRACH preamble of the second message 1 are both associated with a same DMRS symbol pattern. In some embodiments, the method further includes, upon detecting the DMRS collision, estimating the channel conditions using only characteristics of the message 1; and upon absence of detecting the DMRS collision, estimating the channel conditions using the DMRS symbol pattern of the message 3, either alone or in combination with the characteristics of the message 1.

In some embodiments, no two members of the set of DMRS symbols are associated with the same member of the set of PRACH preambles. In some embodiments, the UE may omit a demodulation reference signal (DMRS) from the message 3.

In some embodiments, receiving includes receiving a downlink quality indicator within one or more message 1 and message 3, and the method further includes adapting subsequent transmissions based on the downlink quality indicator. In some embodiments, the method further includes specifying and transmitting, to a UE, a configuration parameter set for use thereby in performing the two-step RACH procedure, the configuration parameter set including a parameter specifying a receive target power for a PRACH preamble transmitted in a message 1 of the two-step RACH procedure.

In accordance with aspects of the present invention, there is provided a method for performing a two-step RACH procedure by a UE, the method including selecting a short PRACH preamble for transmission in a message 1 of the two-step RACH procedure; selecting one of a plurality of transmission occasions within a slot for transmitting the short PRACH preamble, said one of the plurality of transmission occasions being separated from a beginning of transmission of a message 3 of the two-step RACH procedure by a corresponding gap; transmitting the selected short PRACH preamble during the selected transmission occasion; and subsequently transmitting the message 3 following the gap.

In some embodiments, the method further includes omitting transmission of a DMRS symbol pattern within the message 3 when the gap is smaller than a predetermined threshold size.

In accordance with aspects of the present invention, there is provided a method for channel estimation by a radio access network (RAN) infrastructure node, the method including receiving, as part of a two-step random access channel (RACH) access procedure, a combination of a message 1 plus a message 3 from a UE, wherein a short PRACH preamble of the message 1 is separated from a start of the message 3 by a variable length gap; and estimating channel conditions using characteristics of one or both of the message 1 and the message 3.

In some embodiments, the method further includes, when a length of the gap is less than a predetermined threshold, estimating channel conditions using the characteristics of the message 1 and not the characteristics of the message 3.

In accordance with aspects of the present invention, there is provided a method for performing a two-step RACH procedure by a UE, the method including a downlink quality indicator within one or more messages transmitted by the UE as part of the two-step RACH procedure.

In some embodiments, the method further includes transmitting downlink control information (DCI) in association with the two-step RACH procedure, the DCI including one or more of: an uplink grant for use in performing hybrid automatic repeat request (HARQ) retries; and a negative acknowledgement indicative that the PUSCH is not decoded and the UE should determine whether to retry the two-step RACH procedure. In some embodiments, the DCI further includes a downlink grant for use in transmitting a message 2 plus a message 4 of the two-step RACH procedure.

In accordance with aspects of the present invention, there is provided a method for channel estimation by a radio access network (RAN) infrastructure node, the method including receiving a downlink quality indicator within one or more messages transmitted by the UE as part of the two-step RACH procedure, and adapting subsequent transmissions based on the downlink quality indicator.

In accordance with aspects of the present invention, there is provided a method for performing a two-step RACH procedure, the method including transmitting downlink control information (DCI) in association with the two-step RACH procedure, the DCI including one or more of: an uplink grant for use in performing hybrid automatic repeat request (HARQ) retries; a downlink grant for use in transmitting a message 2 plus a message 4 of the two-step RACH procedure; and a negative acknowledgement indicative that the PUSCH is not decoded and the UE should determine whether to retry the two-step RACH procedure. It will be understood that the negative acknowledgement indicative that the PUSCH is not decoded and the UE should determine whether to retry the two-step RACH procedure, can be described as a "fallback" to RAR or may be considered as a backoff indication to determine if a retry of the two-step RACH procedure can be performed.

In some embodiments, the UE transmits a sacrificial DMRS in the message 3 in order to transmit continuously during at least a DMRS portion of the message 3, the sacrificial DMRS ignored by the RAN infrastructure in receipt thereof. In some embodiments, the UE transmits one or more copies of a sacrificial short PRACH preamble within the gap in order to transmit continuously during the gap, the one or more copies of the sacrificial short PRACH preamble ignored by the RAN infrastructure in receipt thereof.

In accordance with aspects of the present invention, there is provided a method for performing a two-step RACH procedure, the method including specifying and transmitting, to a UE, a configuration parameter set for use thereby in performing the two-step RACH procedure, the configuration parameter set including a parameter specifying a receive target power for a PRACH preamble transmitted in a message 1 of the two-step RACH procedure.

In accordance with aspects of the present invention, there is provided a method for performing a two-step RACH procedure, the method including transmitting, by a UE and within a combined message 1 plus a message 3 of the two-step RACH procedure, one or both of: a channel quality indicator indicative of downlink quality; and an uplink buffer status of the UE.

In accordance with aspects of the present invention, there is provided a method for performing a two-step RACH procedure by a UE, the method including determining whether to use a short PRACH preamble format or a long PRACH preamble format; and performing the two-step RACH procedure using the determined short PRACH preamble format or long PRACH preamble format. In some embodiments, determining whether to use a short PRACH preamble format or a long PRACH preamble format is based on one or more network conditions.

In some embodiments, the method further includes selecting a short PRACH preamble for transmission in a message 1 of the two-step RACH procedure and selecting one of a plurality of transmission occasions within a slot for transmitting the short PRACH preamble, said one of the plurality of transmission occasions being separated from a beginning of transmission of a message 3 of the two-step RACH procedure by a corresponding gap, transmitting the selected short PRACH preamble during the selected transmission occasion and subsequently transmitting the message 3 following the gap.

In some embodiments, the UE transmits a sacrificial DMRS in the message 3 in order to transmit continuously during at least a DMRS portion of the message 3. In some embodiments, the UE transmits one or more copies of a sacrificial short PRACH preamble within the gap in order to transmit continuously during the gap.

In accordance with aspects of the present invention, there is provided a method for performing a two-step RACH procedure by a UE, the method including transmitting a message 1 of the two-step RACH procedure in a PRACH slot spanning a first frequency range; and transmitting a message 3 of the two-step RACH procedure in one or more PUSCH slots, wherein the one or more PUSCH slots span a second frequency range greater than the first frequency range.

In accordance with aspects of the present invention, there is provided a method for performing a two-step RACH procedure by a UE, the method including transmitting a message 1 of the two-step RACH procedure in a PRACH slot; and transmitting a message 3 of the two-step RACH procedure in one or more of a plurality of PUSCH slots mapped to the PRACH slot.

In accordance with aspects of the present invention, there is provided a method for performing a two-step RACH procedure by a UE, the method including transmitting a message 1 of the two-step RACH procedure at least partially using a predetermined slot; and transmitting a message 3 of the two-step RACH procedure at least partially using the same predetermined slot. In some embodiments, the message 1 includes a PRACH preamble transmitted at one of a set of one or more PRACH preamble transmission occasions within the predetermined slot. In some embodiments, the message 1 and the message 3 are both entirely contained within the predetermined slot.

In accordance with aspects of the present invention, there is provided a method for performing a two-step RACH procedure, the method including communicating, a message A of the two-step RACH procedure, the message A comprising a PRACH portion and a PUSCH portion; and upon failing to decode the PUSCH portion, initiating a hybrid automatic repeat request (HARQ) operation.

In accordance with aspects of the present invention, there is provided a method for performing a two-step RACH procedure, the method including providing multiple configurations for the two-step RACH procedure; selecting one of the multiple configurations; and performing the two-step RACH procedure using parameters in the selected one of the multiple configurations. In some embodiments, each of the multiple configurations specifies: one or more coverage range thresholds; one or more PUSCH modulation and coding schemes; and a PRACH format. In some embodiments, the method further includes selecting, by a UE, one of the multiple configurations based at least in part on a measured reference signal received power (RSRP) level.

In accordance with aspects of the present invention, there is provided an apparatus in a wireless communication network comprising a radiofrequency transmitter and receiver and an electronics section including a processor and memory. The memory storing instructions, which when executed by the processor configure the apparatus to perform one, some or all of the above-described methods. The apparatus may be a UE (mobile device, machine-type communication device, etc.). The apparatus may be a RAN infrastructure device (eNB, gNB, base station, portion thereof, etc.).

BRIEF DESCRIPTION OF THE FIGURES

These and other features of the invention will become more apparent in the following detailed description in which reference is made to the appended drawings.

DETAILED DESCRIPTION OF THE INVENTION

As mentioned above, the two-step RACH method involves the UE transmitting two messages together, namely a message 1 comprising a random access preamble, and a message 3, such as an RRC connect request message. The preamble can be randomly selected from one of 64 preambles. Message 3, as with a variety of other messages within LTE, may include a demodulation reference signal (DMRS). For example, one of 12 different DMRS symbol patterns may be included in a slot carrying message 3.

In various embodiments, the DMRS is made up of individual symbols that form part of multiple different sequences. For example, the DMRS sequence may comprise QPSK symbols generated based on Gold sequences, as in cyclic prefix orthogonal frequency division multiplexing (CP-OFDM). As another example, the DMRS sequence may be based on Zadoff-Chu sequences and may exhibit low peak to average power ratio (PAPR), as in the case of PUSCH with discrete Fourier transform spread OFDM (DFT-S-OFDM).

Figure 1:
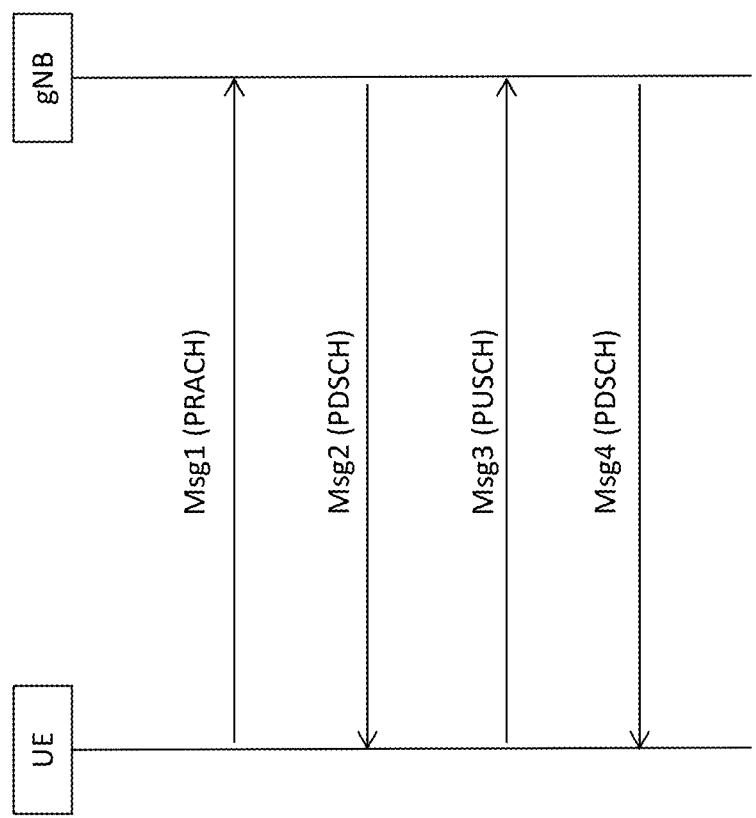
FIG. 1 illustrates a four-step RACH messaging sequence between a terminal and a base station according to the prior art LTE standard.
Figure 2:
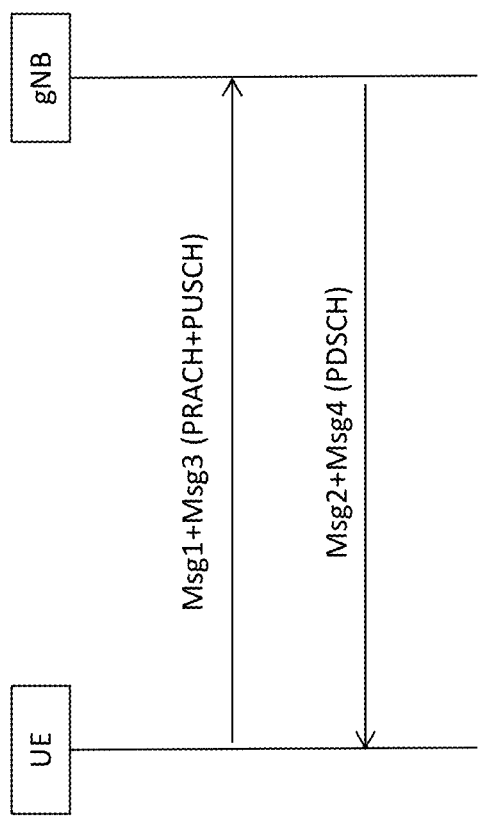
FIG. 2 illustrates a two-step RACH messaging sequence between a terminal and a base station according to the prior art LTE standard.
Figure 3:
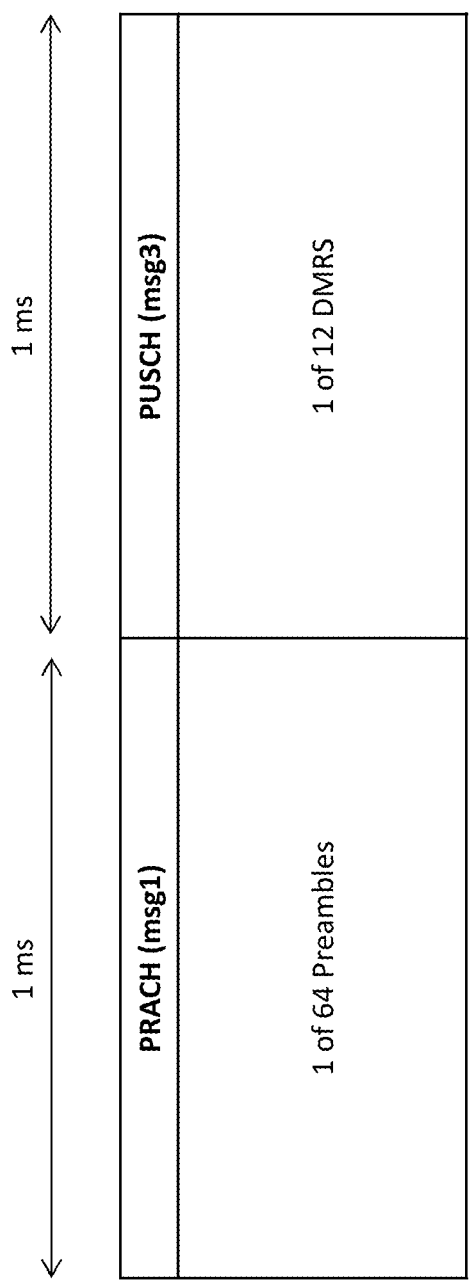
FIG. 3 illustrates an example of contiguously transmitted messages 1 and 3 in a two-step RACH procedure.

FIG. 3 illustrates an example of transmission of message 1 and message 3 together. Message 1 is transmitted in a first slot via the PRACH and includes 1 of 64 PRACH preambles. Message 3 is transmitted in a second slot (e.g. immediately following the first slot) via the PUSCH and includes 1 of 12 DMRS symbol patterns.

Figure 4:
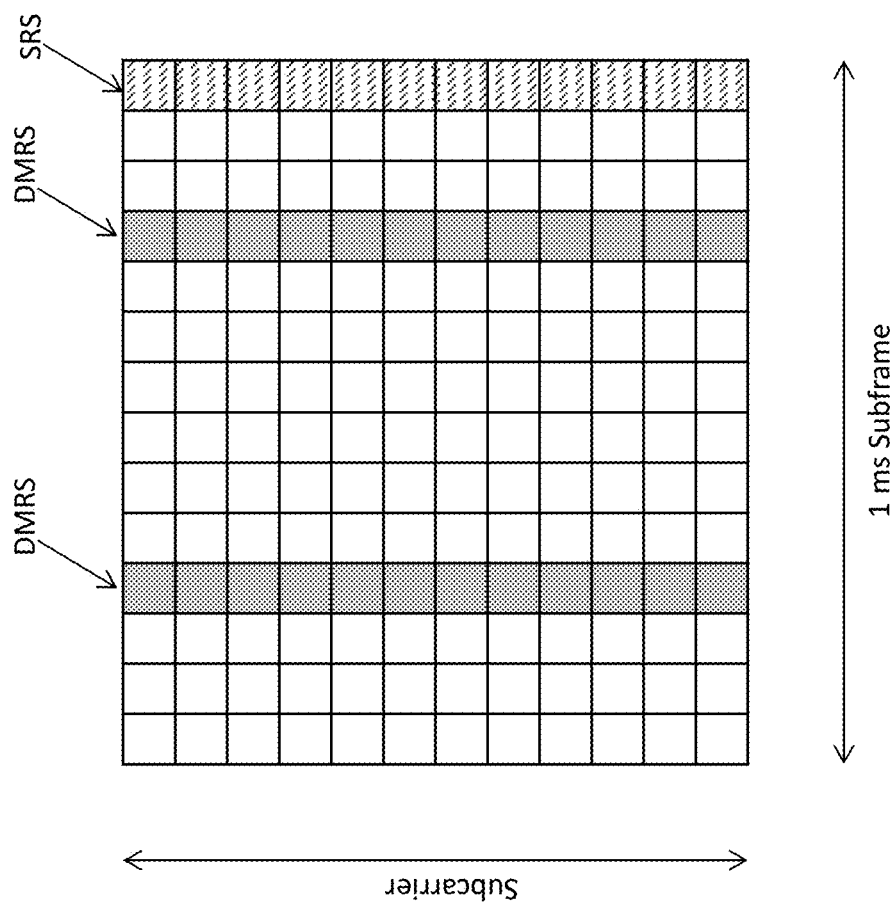
FIG. 4 illustrates an example structure of an LTE subframe in accordance with the prior art.

FIG. 4 illustrates an example structure of an LTE subframe in accordance with the prior art. The subframe spans 12 subcarriers (each 15 kHz) each potentially transmitting a sequence of up to 14 OFDM (or SC-FDMA) symbols over time. The fourth and eleventh symbol occasions are typically used (in the prior art) for transmission of DMRS symbols. It is noted that, in some embodiments of the present invention, such occasions are not used to transmit DMRS symbols, or the receiver ignores the symbols (if any) in such occasions, or both. The fourteenth symbol occasion is typically used for transmission of a sounding reference symbol (SRS).

FIG. 4 is provided for reference, and it is noted that the present invention is not limited to such subframe structures. In particular, the present invention maybe configured to operate in accordance with the 3GPP NR specification (e.g. the 5G NR frame structure), and the usage of the word "slot" herein may correspond to the 3GPP NR definition thereof. In the NR specification, rather than a 1 ms subframe having two slots, a subframe can have 1, 2, 4, 8 or 16 slots, for example depending on the subcarrier spacing corresponding to 15, 30, 60, 120 or 240 kHz. Each NR slot may include 14 symbols, but the slot duration can be different depending on the numerology. Higher bandwidth numerologies can have shorter symbols.

When two UEs transmit on the PUSCH using the same DMRS symbol pattern at the same time, there is said to be a collision. The RAN infrastructure uses the DMRS for decoding, and does not well tolerate such collisions. It has been recognized by the inventors that the limited number (12) of DMRS symbol patterns leads to a relatively high likelihood of collisions and thus limits uplink spectral efficiency. When more than one UE chooses the same DMRS symbol pattern, the infrastructure gNB cannot obtain a valid channel estimate and thus cannot decode the colliding PUSCH message(s).

According to embodiments of the invention, to mitigate this problem, when receiving a combined message 1 plus message 3 from a UE (transmitted in accordance with a two-step RACH procedure), the RAN infrastructure is configured to estimate channel conditions using characteristics of the message 1, rather than the DMRS included in message 3. For example, the RAN infrastructure (e.g. gNB) may use the PRACH preamble transmitted via PUSCH as part of message 1 as input to its channel estimation procedure, in place of (or in addition to) the DMRS symbol pattern of message 3. This approach may be advantageous for example when the channel coherence time is greater than 1 ms, which is considered appropriate to many use cases.

Accordingly, in embodiments of the present invention, a gNB can use the PRACH preamble for channel estimation of the PUSCH. The present invention also provides for a two-step RACH procedure which is configured to support such a capability of the gNB.

In various embodiments, channel estimation using the PRACH preamble is performed in a similar manner to channel estimation using the DMRS. For example, using a-priori knowledge of an expected symbol sequence, whether DMRS or PRACH, a RAN infrastructure node may model the channel distortion by comparing the actual received symbol sequence with an ideal version of the expected symbol sequence. Given that the permissible sequences are a subset of all possible (e.g. random) sequences, and given that the permissible sequences have significant differences between each other, the possibility of finding a match despite errors is still acceptably high.

Figure 5:
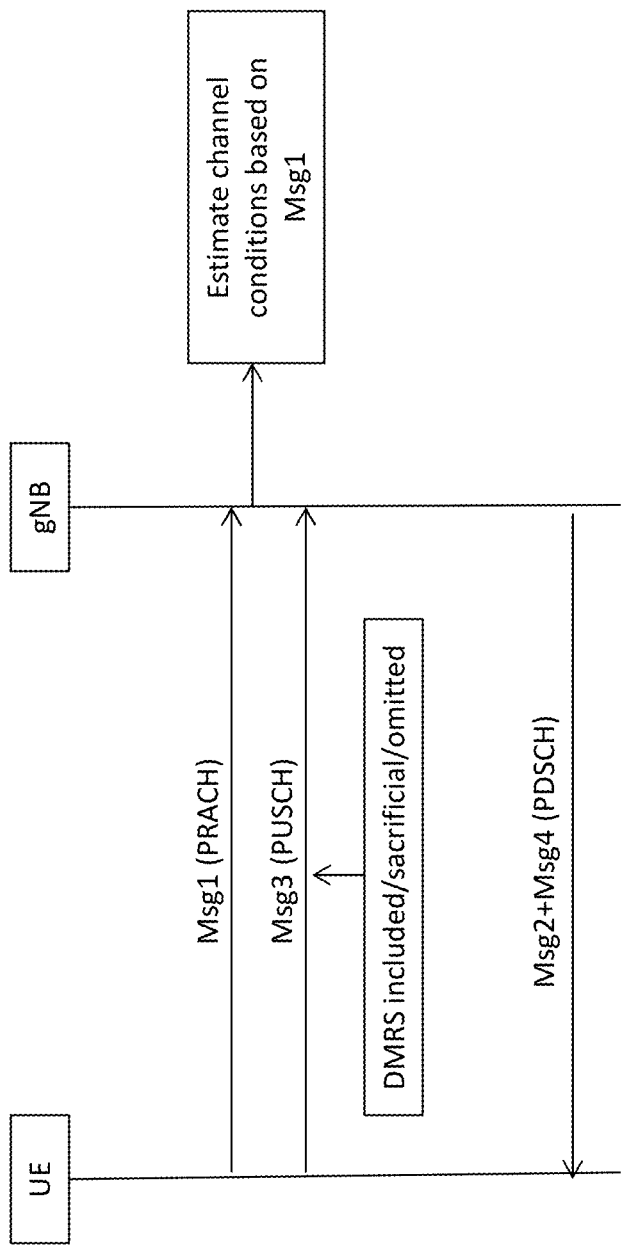
FIG. 5 illustrates a method for estimating channel conditions from characteristics of message 1 of a two-step RACH procedure, in accordance with embodiments of the present invention.

FIG. 5 illustrates an example of the above embodiment, in which the gNB receives Msg1 and Msg3, and estimates channel conditions based partially or fully on characteristics of the Msg1. Also illustrated (and as described below), the DMRS of message 3 may either be included, omitted, or set to a sacrificial (default) pattern.

In view of the above, and according to another embodiment of the invention, the UE can be configured to omit the DMRS from its message 3 when transmitting a combined message 1 plus message 3 in accordance with the two-step RACH. Consequently, the portion of the slot previously allocated in the standard (e.g. the fourth and eleventh symbols of the slot. This leads to a reduction in UE power requirements within the PRACH process, because fewer symbols are transmitted. Alternatively, this portion of the slot may be used for another purpose. Alternatively, this portion of the slot can be used to transmit a default (sacrificial) DMRS, in order to avoid transmission gaps.

Alternatively, the UE can be configured to retain the DMRS in its message 3 when transmitting a combined message 1 plus message 3 in accordance with the two-step RACH. The RAN infrastructure (e.g. gNB) can be configured to use the DMRS in a received message 3 in some instances but not others. In some such embodiments, each PRACH preamble is mapped to one of the 12 possible DMRS symbol patterns. Multiple PRACH preambles are mapped to at least one DMRS symbol pattern. For example, when all 64 PRACH preambles are so mapped, each DMRS symbol pattern is associated with an average of 5.33 different PRACH preambles. This allows the RAN infrastructure to detect DMRS collisions. In particular, when the RAN infrastructure receives two different PRACH preambles which map to the same DMRS symbol pattern, a DMRS collision is detected, because it is inferred that two different message 3's include this same DMRS symbol pattern.

For example, PRACH preambles 1-10 may be mapped to DMRS symbol pattern #1 (for some arbitrary numbering scheme). If the RAN infrastructure (gNB) detects PRACH patterns #2 and #5 in two different instances of Msg1 concurrently transmitted by two different UEs, it can be concluded that a DMRS collision occurred or is about to occur in the corresponding Msg3 instances of the UEs, when performing the two-step RACH.

Figure 6:
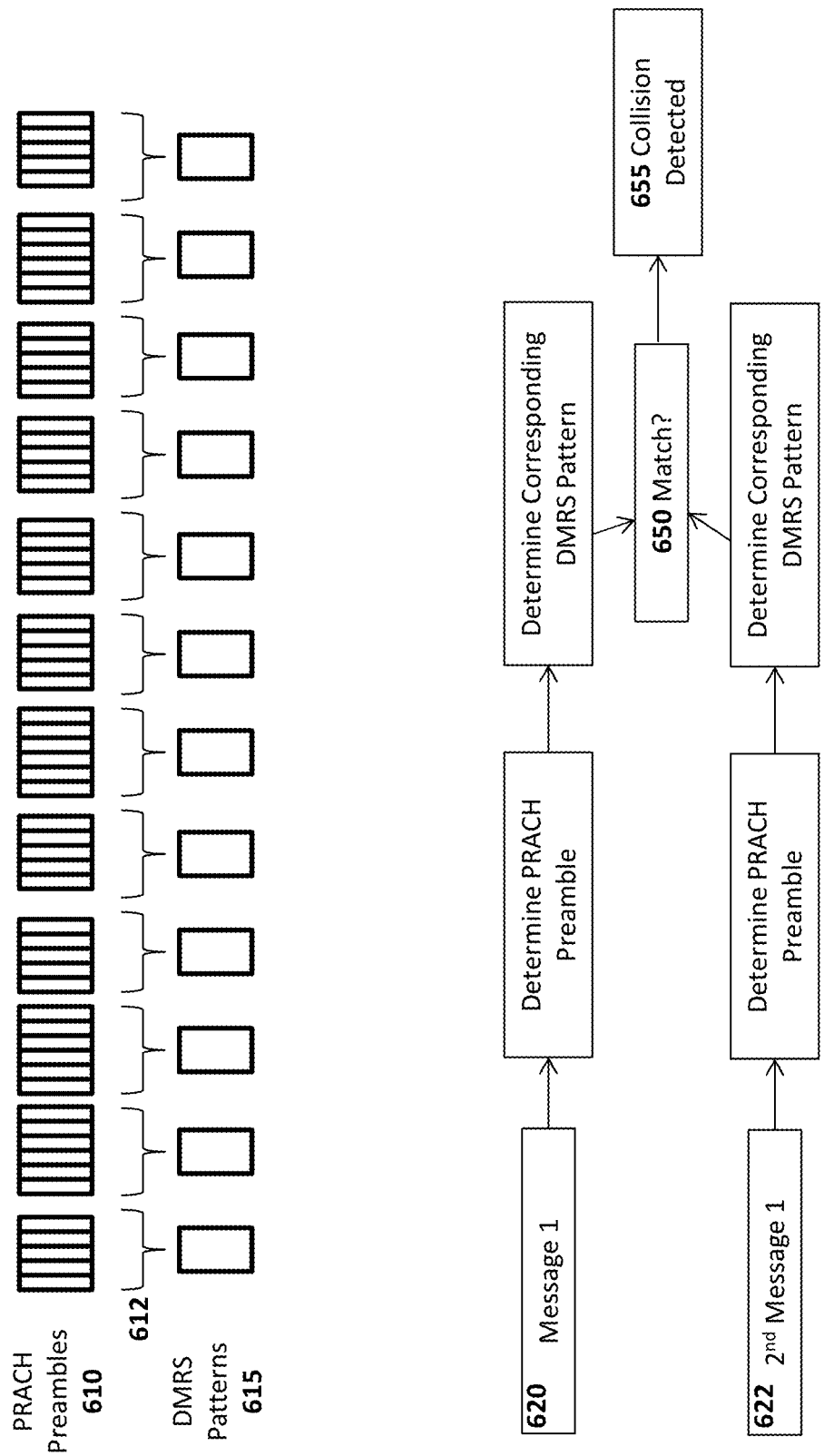
FIG. 6 illustrates a method for detecting DMRS collisions based on PRACH preambles, in accordance with embodiments of the present invention.

FIG. 6 generally illustrates the above situation. Each PRACH preamble of a PRACH set 610 is associated (the associations being illustrated via braces 612) with a corresponding DMRS symbol pattern of a DMRS set 615. When two message 1's 620, 622 are received concurrently, the PRACH preambles thereof are determined. The DMRS symbol patterns corresponding to the determined PRACH preambles are then determined according to the above association. This determination is based on the PRACH preambles, not detection of DMRS in Msg3. If there is a match 650, that is, if the determined DMRS symbol pattern for message 1 620 is the same as the determined DMRS symbol pattern for the second message 1 622, then a collision is detected/declared 655.

The illustrated number of PRACH preambles corresponding to each DMRS symbol is provided as an example only. In some embodiments, all of the PRACH preambles are allocated to all of the DMRS symbol patterns. In some embodiments, fewer than all of the PRACH preambles are allocated to all of the DMRS symbol patterns. In some embodiments, all of the PRACH preambles are allocated to fewer than all of the DMRS symbol patterns. In some embodiments, fewer than all of the PRACH preambles are allocated to fewer than all of the DMRS symbol patterns. In some embodiments, at least one DMRS symbol pattern has a single corresponding PRACH preamble. In some embodiments, at least one DMRS symbol pattern has two or more corresponding PRACH preambles. In various embodiments, any of the twelve DMRS patterns may be used with any of the 64 PRACH preambles.

In further embodiments, when there is a detected DMRS collision but no PRACH collision, the RAN infrastructure may be configured to use only the PRACH channel (message 1) information for identification and channel estimation, ignoring the DMRS. When no DMRS collision is detected, the RAN infrastructure may be configured to use the DMRS signal, or both the PRACH channel information and the DMRS signal, for channel estimation.

The above-described embodiments in which PRACH preambles are mapped to PUSCH DRMS patterns will now be described in more detail. Such embodiments may support reuse of the Release 15 NR PUSCH, including the Release 15 DMRS for transmission of payload of two-step RACH message 1 combined with message 3 (collectively referred to as msgA).

As mentioned above, while there are several PRACH preambles that the UE can select from, the number of unique DMRS symbol patterns available for the PUSCH is limited (e.g. to only 12). The limited number of Release 15 DMRS patterns can lead to DMRS collisions that potentially result in PUSCH failures. If the UE randomly selects the DMRS pattern to be used in the PUSCH in msgA, this may lead to a DMRS collision when more than one UE selects the same DMRS pattern. If the UE randomly selects both the PRACH preamble and PUSCH DMRS, the UE may select a unique PRACH preamble but end up selecting the same DMRS as another UE. The gNB would be able to identify the PRACH preambles but there would be a DMRS collision that cannot be resolved. A DMRS collision causes the gNB to have a low probability of decoding the PUSCH, for example because an accurate channel estimate is not available. A PUSCH decoding failure can result in the gNB being unable to send msgB (e.g. message 2 combined with message 4) because the PUSCH is expected to carry the UE ID that is needed for msgB.

The PRACH preambles are typically not able to carry the UE ID; the PUSCH is expected to carry the UE ID that is needed for msgB (the combination of message 2 and message 4). Hence a PUSCH decoding failure can result in the gNB being unable to send msgB. It may be possible to fall back to a 4-step PRACH procedure (using the detected preamble) after such a failure. However, it has been recognized by the inventors that it is desirable to avoid the extra transmissions and reduce the collision probability.

According to embodiments of the present invention, a fixed mapping of the PRACH preamble to the PUSCH DMRS is provided. This allows the gNB to predict DMRS collisions based on the detected PRACH. This is possible because there are more available PRACH preambles compared to DMRS patterns. Therefore, according to embodiments, the two-step RACH procedure (and associated method and apparatus) is configured to support mapping of more than one PRACH preamble to one PUSCH DMRS symbol pattern. Different sets of one or multiple PRACH preambles can be mapped to different single DMRS symbol patterns.

The mapping of the PRACH preambles to PUSCH DMRS patterns does not need to be linear. Each DMRS does not necessarily need to be mapped to the same number of PRACH preambles. There may be multiple different ratios of PRACH preambles to DMRS symbol patterns that would allow allocating of PRACH preambles in order to reduce the probability of a DMRS collision for select UEs. A particular ratio and/or mapping can be determined and used based on parameters such as UE coverage level, for example, where the gNB may need the DMRS.

It is noted that, if there is a mapping of PRACH preambles to DMRS patterns, DMRS collisions can be resolved when the PRACH preambles do not also collide.

If the PRACH and the PUSCH resources are sufficiently close in time, frequency, or both, then the gNB may be able to use the PRACH preamble for the channel estimation of the PUSCH in MsgA, instead of the DMRS. That is, the RAN infrastructure (gNB) can use the PRACH preamble for the channel estimation of the PUSCH. Based on the detected PRACH preambles, the gNB can also be configured to determine whether to use the DMRS for the channel estimation. Furthermore, the ratio of the PRACH/DMRS (e.g. the number of PRACH preambles per DMRS pattern) used in the mapping of the PRACH preamble to the PUSCH DMRS may be selected based on the proximity of the PRACH and the PUSCH resources.

It has been recognized by the inventors that the limited number (e.g. 64) of PRACH preambles in use can lead to collisions and thus limit uplink spectral efficiency. When more than one UE chooses the same PRACH preamble, the RAN infrastructure may not explicitly detect a collision, but rather may only detect a PUSCH error. The PUSCH error would trigger a HARQ retransmission operation which would likely fail.

Use of short PRACH preamble signals has been defined in the 3GPP New Radio Release 15 specification, but not in the context of the two-step RACH. For example, short PRACH preamble is specified in Section 5.3.4 of 3GPP TS 38.300, "Technical Specification Group Radio Access Network; NR; NR and NG-RAN Overall Description; Stage 2 (Release 15)," version 15.4.0, December 2018, and Section 6.3.3.1, including Tables 6.3.3.1-1 and 6.3.3.1-2, of 3GPP 38.211, "Technical Specification Group Radio Access Network; NR; Physical channels and modulation (Release 15)," version 15.4.0, January 2019. Use of short PRACH preamble signals may increase the number of PRACH occasions which can reduce the probability of collision.

Figure 7:
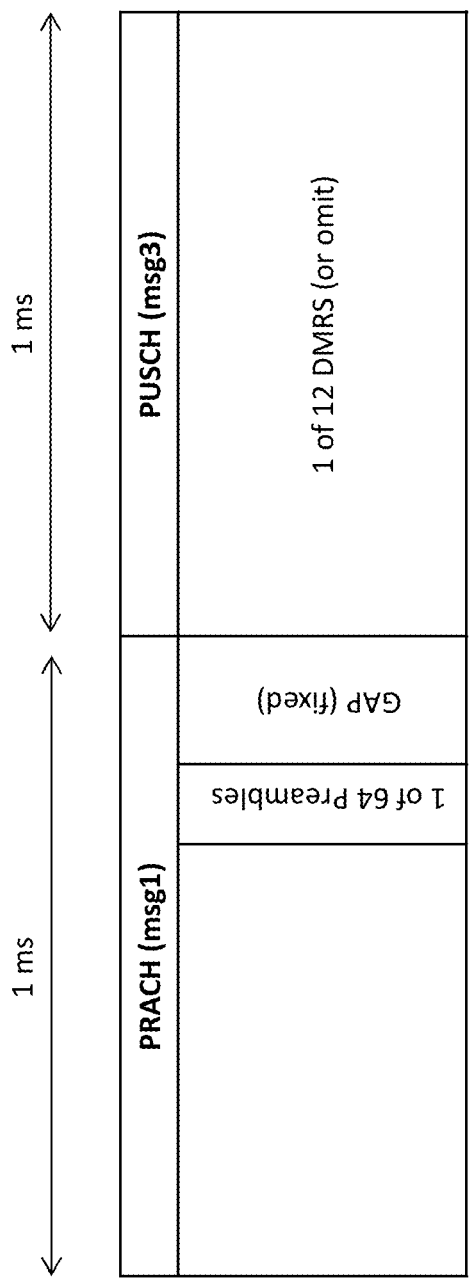
FIG. 7 illustrates contiguously transmitted messages 1 and 3 in a two-step RACH procedure, in which message 1 includes a short PRACH preamble separated from message 3 by a fixed-length gap, in accordance with embodiments of the present invention.

Some implementations of two-step RACH include a gap of a fixed time interval interposed between the message 1 (PRACH) transmission and the message 3 (PUSCH) transmission. FIG. 7 illustrates this situation. The gap is useful to avoid overlap of message 1 (PRACH) with message 3 (PUSCH) when UEs have large timing errors. However, use of a fixed gap only allows for one short PRACH transmission occasion, as shown in FIG. 7.

Figure 8:
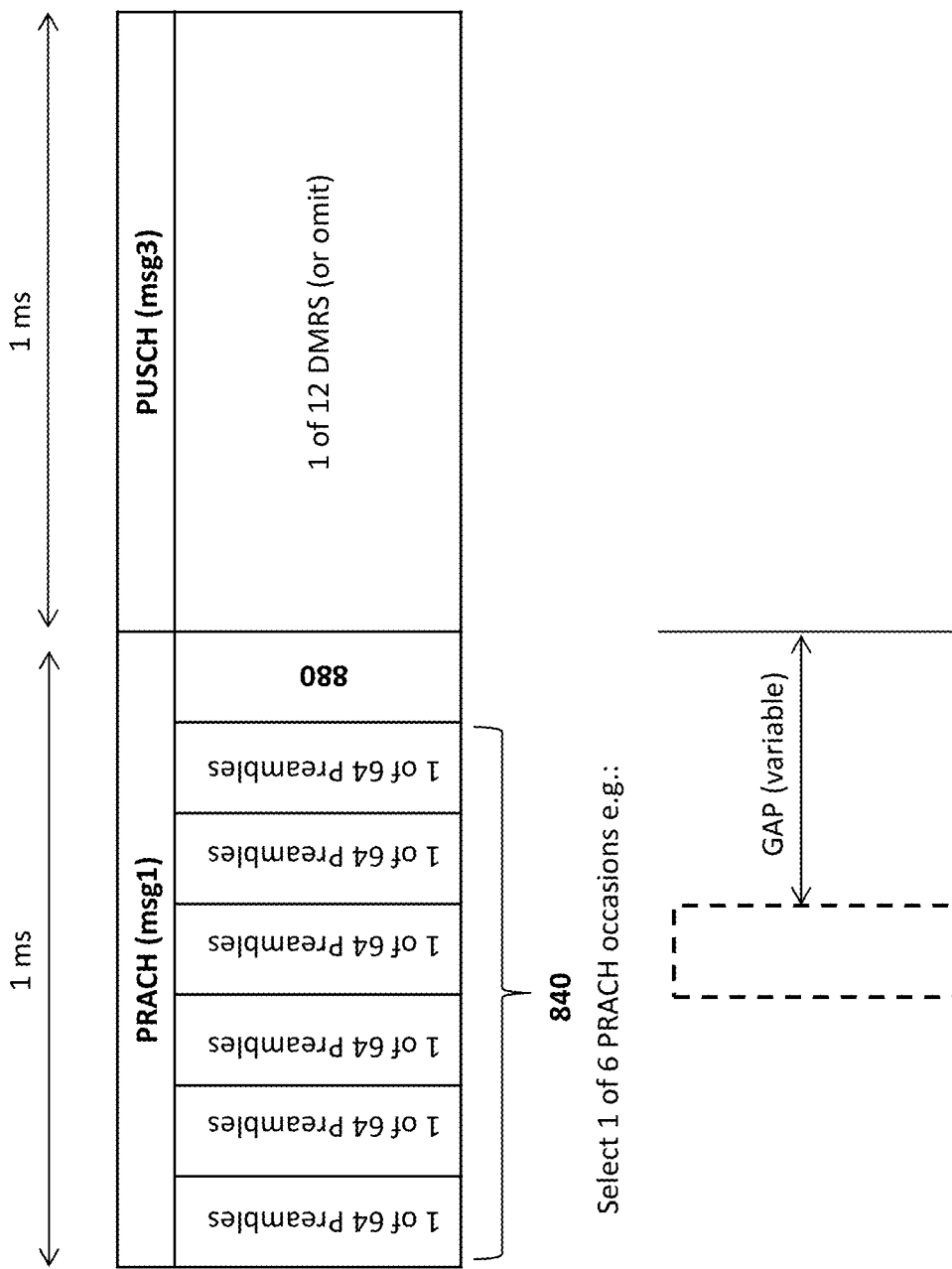
FIG. 8 illustrates contiguously transmitted of messages 1 and 3 in a two-step RACH procedure, in which message 1 includes a short PRACH preamble separated from message 3 by a variable-length gap, according to embodiments of the present invention.

Accordingly, embodiments of the present invention comprise using a short PRACH preamble (e.g. of length 2 symbols, where 14 symbol occasions occur per slot), and introducing a gap of variable length (in time) between the short PRACH preamble of message 1 and the message 3 transmission on the PUSCH, of a two-step RACH transmission by a UE. The UE is configured to randomly select a PRACH preamble, and also randomly select one of multiple PRACH occasions in which to transmit the PRACH preamble. As illustrated in FIG. 8, the multiple PRACH occasions may be separated from the PUSCH transmission by a variable length gap. In one embodiment, each PRACH occasion may be of length 2 symbols, and the last 2 symbols may be unused, so that the gap length is at least 2 symbols long. The combination of variable PRACH preambles and variable PRACH occasions leads to a greater number of PRACH preamble transmission possibilities, which reduces collision probability on the PRACH. That is, for two UEs to collide, they both need to transmit the same PRACH preamble on the same PRACH occasion (assuming synchronization), which is less likely than the previous condition of merely needing to transmit the same PRACH preamble. This approach allows for time division multiplexing (TDM) of PRACH preamble transmissions by different UEs within the same slot, by having different UEs select different PRACH occasions, for example via a random process.

The illustrated approach allows for six short PRACH occasions 840, with the gap length between the PRACH preamble transmission and the PUSCH transmission now being variable. If a minimum gap of 2 symbols is not needed, a seventh PRACH occasion 880 can also be used. The UE selects one of the multiple PRACH occasions, along with one of the 64 short PRACH preambles, and transmits this as its message 1 (or part thereof). The UE follows with transmission of its message 3. The gap length between end of transmission of the PRACH preamble and beginning of transmission of the message 3 is equal to $x=2(7-y)$ symbols, where y denotes the PRACH occasion being used, e.g. $y=1$ when the first PRACH occasion in FIG. 8 is used. By way of example, FIG. 8 illustrates the length (i.e. 6 symbols) of the variable length gap when the fourth PRACH occasion is selected. As will be discussed below, the UE can either refrain from transmitting in the gap or transmit a "sacrificial" signal in the gap.

In further embodiments, when the PRACH occasion being used is sufficiently close to the beginning of the PUSCH transmission (e.g. when y is greater than or equal to a predetermined threshold, such as 6 symbols, or equivalently when there is a small gap between the selected PRACH preamble occasion and the PUSCH transmission), the UE can be configured to omit transmission of the DMRS symbols in the message 3, or the RAN infrastructure may be configured to perform channel estimation based on characteristics (e.g. PRACH preamble) of the message 1, or both. This approach can conserve power and reduce DMRS collisions. It is observed that, for PRACH preambles transmitted earlier in the slot (corresponding to a larger gap between PRACH preamble and PUSCH) the channel estimate (based on the PRACH) is more likely to be out-dated with respect to Msg3, and thus it may be better in these cases to use the DMRS symbols in Msg3 for channel estimation. Accordingly, the UE may be configured to include the DMRS symbols in such cases.

According to embodiments of the present invention, the two-step RACH procedure is configured to support both short and long PRACH preamble formats. For example, the UE and RAN infrastructure can be configured to utilize short PRACH preamble formats under some conditions, and to utilize long PRACH preamble formats under other conditions.

In more detail, PRACH formats as defined in 3GPP Release 15 include long and short PRACH formats. Each of these two formats may target different deployment scenarios, cell sizes, frequency ranges, UE velocity, frame structure and beams. The two-step RACH procedure may be intended as a general RACH procedure for NR. As such, it is recognized herein that the two-step RACH procedure should support both long and short PRACH preambles. In some embodiments, one or more deployment scenarios (e.g. high-speed scenarios) are excluded from using two-step RACH. However, it is also considered that RAN1 may support as many of the 3GPP Release 15 PRACH formats as possible.

As described above as well as further below, the PRACH with short preambles (e.g. length 2 symbols) allows for more than one PRACH occasion within the PRACH slot. This can increase the number of PRACH occasions and reduce the probability of PRACH preamble collisions. NR-U deployment scenarios are typically for smaller cells and higher frequencies, for which these shorter PRACH preambles are particularly more suitable. Some lower frequency, larger cell deployments may benefit from a two-step RACH requiring long PRACH format support.

The above-mentioned TDM of PRACH preambles and PUSCH transmission, in a two-step RACH procedure, will now be described in more detail.

As used herein, message A (msgA) is defined, in the context of the two-step RACH procedure, as the PRACH preamble plus the data-carrying transmission on the PUSCH. That is, msgA corresponds to the combination of message 1 plus message 3. As illustrated by way of example in FIG. 3, the basic format for msgA includes one PRACH slot (containing one or more PRACH occasions) and a slot of PUSCH (using some or all the symbols in the slot).

As is evident from FIG. 8, the Release 15 NR PRACH formats with short preambles allows for multiple PRACH occasions per slot, such that the PRACH slot contains multiple occasions that map to the PUSCH resource. That is, according to embodiments of the present invention, the two-step RACH procedure is configured to support PRACH configurations having multiple PRACH occasions within a single PRACH slot. Assuming that the PUSCH is fully within the frequency allocation of the PRACH slot, two example configurations of PRACH slots having multiple PRACH occasions and followed by a PUSCH slot are shown in FIGS. 9A and 9B, which are provided by way of example.

Figure 9A:
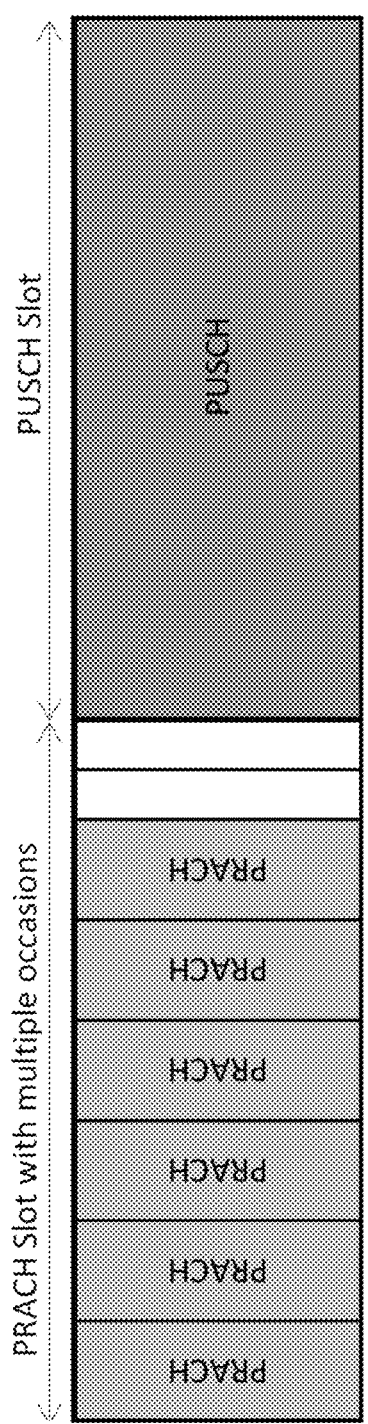
FIGS. 9A and 9B illustrate messages 1 and 3 in a two-step RACH procedure, in which message 1 includes short PRACH preambles separated from message 3 by a variable-length gap, according to embodiments of the present invention.
Figure 9B:
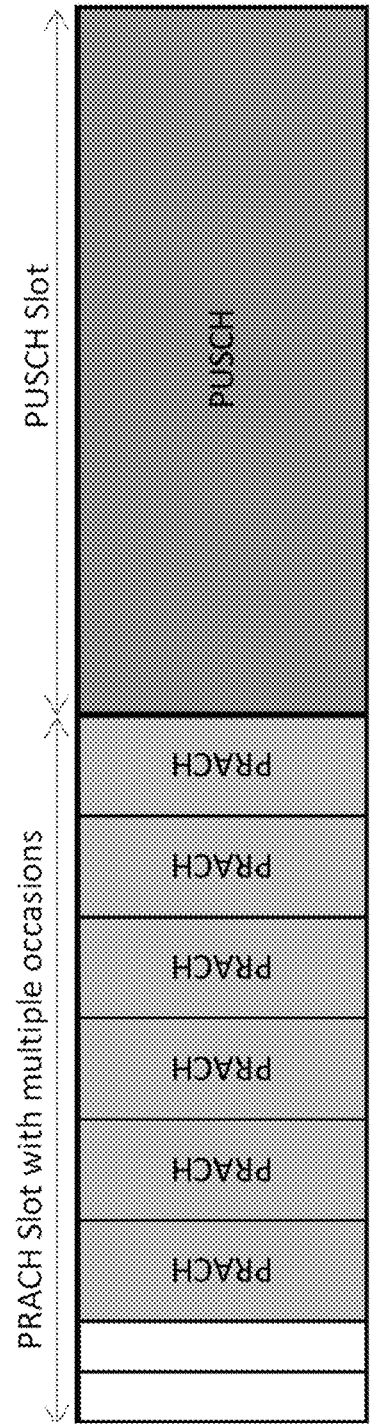

In FIGS. 9A and 9B, there are six PRACH occasions. In a given two-step RACH procedure, a UE selects one of the six PRACH occasions for use, so that there is a variable-length gap between the PRACH occasion and the PUSCH transmission. The PRACH occasions may each be of length two symbols. The PRACH occasions may be contiguous. In FIG. 9A, the gap may have a minimum length of two symbols, with the beginning of the first PRACH occasion being aligned with the beginning of the PRACH slot. In FIG. 9B, there may be no gap at the end of the slot. The beginning of the first PRACH occasion may occur two symbols after the beginning of the PRACH slot.

While there are many PRACH preambles available for the UE to select from (e.g. up to 64), it is still possible that more than one UE selects the same PRACH preamble. This may result in a PRACH collision.

In some cases, when more than one UE selects the same PRACH preamble, the gNB may not know that a PRACH was sent. If it is able to detect a preamble, it may not know that a collision has occurred until it attempts to decode the PUSCH. The gNB in this case would be unable to decode the PUSCH forcing it to request a retransmission.

The consequences of PRACH preamble collisions can be worse for two-step RACH compared to the standard four-step RACH. This is because a collision in two-step RACH leads to a PUSCH resource collision as well. As such, to reduce the probability of collisions, the two-step RACH may be configured to use an increased number of PRACH occasions (e.g. greater than one occasion per slot). Embodiments of the present invention comprise using Release 15 PRACH configurations with multiple occasions within a single PRACH slot, to help reduce the probability of collisions.

Figure 10A:
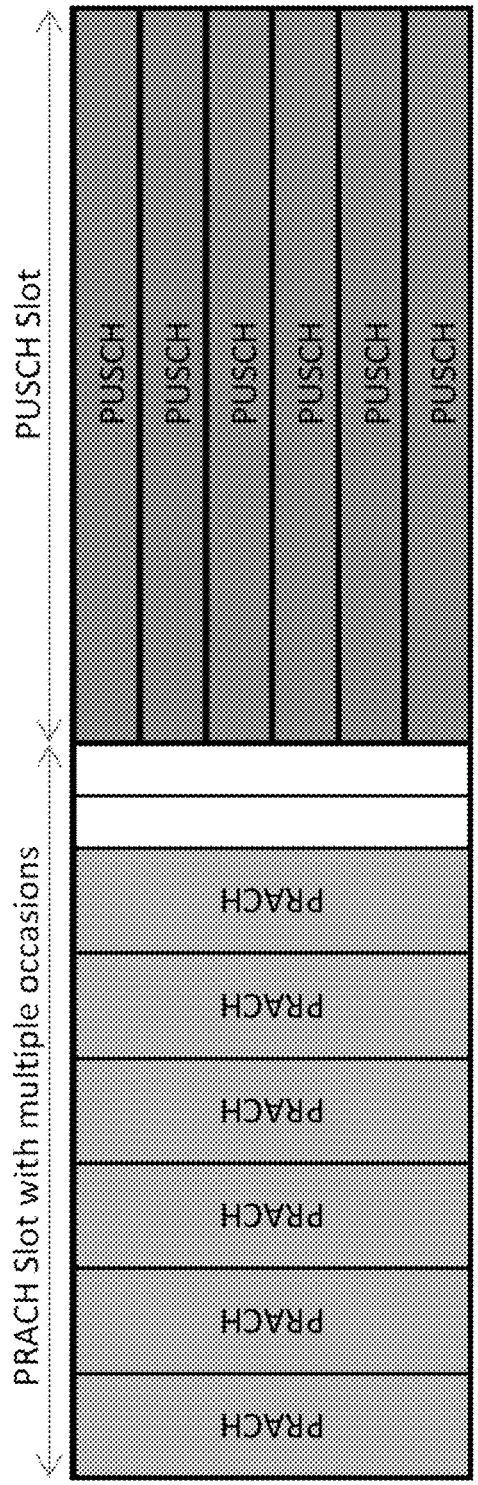
FIG. 10A illustrates messages 1 and 3 in a two-step RACH procedure, in which message 1 includes short PRACH preambles and a variable-length gap, and message 3 includes multiple PUSCH resources in one slot, according to embodiments of the present invention.
Figure 10B:
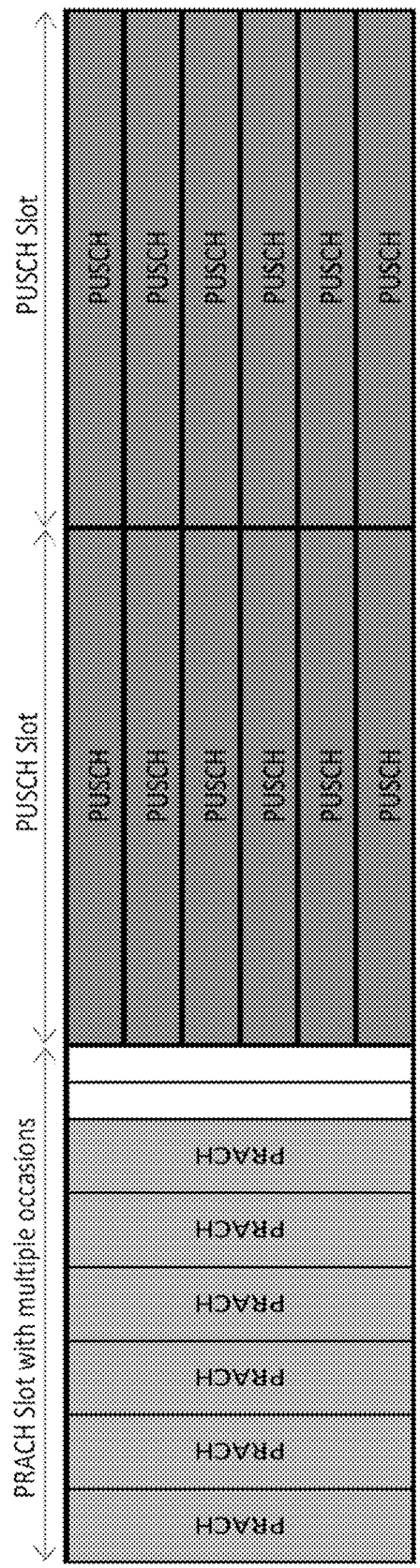
FIG. 10B illustrates messages 1 and 3 in a two-step RACH procedure, in which message 1 includes short PRACH preambles and a variable-length gap, and message 3 includes multiple PUSCH resources in multiple slots, according to embodiments of the present invention.

In some embodiments, the multiple PRACH occasions within one slot may be mapped to multiple PUSCH resources over one or more slots. FIG. 10A illustrates an example of such an embodiment, with a PRACH slot with multiple PRACH occasions being followed by multiple PUSCH resources in a single PUSCH slot. FIG. 10B illustrates another example of such an embodiment, with a PRACH slot with multiple PRACH occasions being followed by multiple PUSCH resources in two (or more) PUSCH slots.

Accordingly, embodiments of the present invention comprise, in a two-step RACH procedure, providing support for mapping a given PRACH to multiple PUSCH allocations. The PUSCH allocation may be frequency division multiplexed (FDM), time division multiplexed (TDM), or both FDM and TDM. As such, a two-step RACH procedure may comprise transmitting, in a msgA, a PRACH preamble in a PRACH slot, followed by a PUSCH transmission in one or more of multiple associated PUSCH slots.

Figure 11:
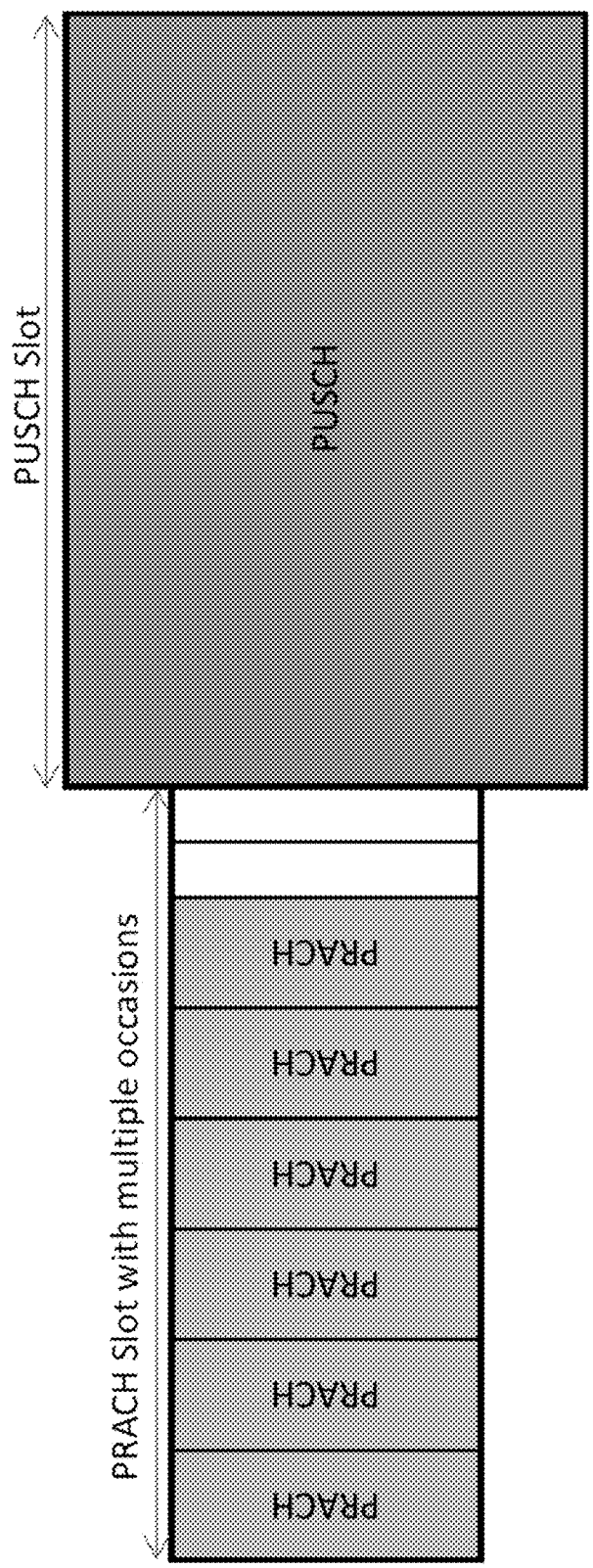
FIG. 11 illustrates messages 1 and 3 in a two-step RACH procedure, in which some or all of the PUSCH resources are allocated outside of the frequency allocation of the PRACH slot, according to embodiments of the present invention.

In some embodiments, some or all of the PUSCH resources are allocated outside of the frequency allocation of the PRACH slot, as illustrated in FIG. 11. FIG. 11 illustrates a PRACH slot with multiple PRACH occasions, followed by a wider set (e.g. in frequency) of PUSCH resources. For example, where the PRACH slot is allocated over 12 subcarriers (each 15 kHz), the PUSCH slot may be allocated over more than 12 subcarriers, with the additional subcarriers being either above, below, or both above and below the subcarriers of the PRACH slot. The allocated subcarriers may be contiguous.

Therefore, instead of using a single 1 ms, 12 subcarrier slot for the PUSCH (message 3) transmission, the PUSCH resources used for message 3 may be greater than the PRACH resources used for message 1 either with respect to time resources, frequency resources, or both. As such, according to embodiments, in the two-step RACH procedure, PUSCH resources may be allocated beyond the PRACH frequency range.

In some embodiments, the two-step RACH procedure is configured and operated to support communication of both PRACH and PUSCH symbols in a same (single) slot. Further embodiments of the present invention comprise allowing the two-step RACH procedure to use only a subset of the PRACH occasions within a PRACH slot, to allow for inclusion of PRACH and PUSCH symbols in a single, same slot. It is noted that this may require allowing only some of the PRACH occasions to be used within PRACH format. Such embodiments may allow two-step RACH procedure to be relatively more compact, with a few symbols of PRACH short preambles and the PUSCH with a short time domain allocation.

Figure 12A:
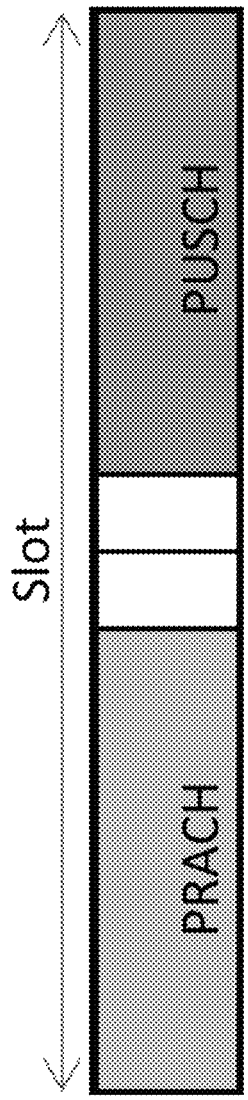
FIGS. 12A and 12B illustrate examples in which messages 1 and 3 in a two-step RACH procedure are included in the same slot, according to embodiments of the present invention.
Figure 12B:
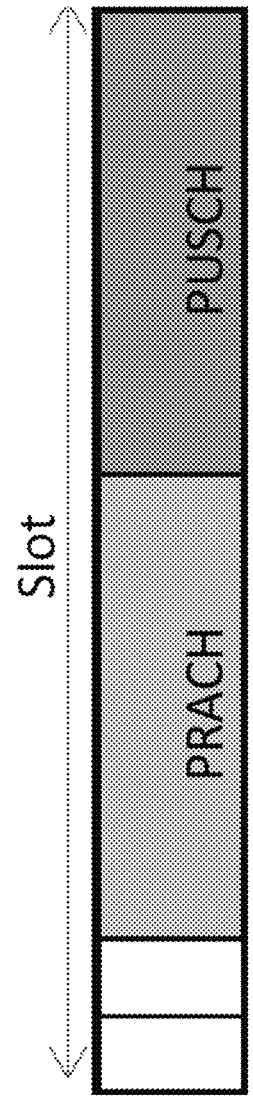

FIGS. 12A and 12B illustrate examples of such embodiments, with a single slot including both a PRACH (message 1) transmission and a PUSCH (message 3) transmission. In FIG. 12A, the two transmissions are separated by a gap (e.g. of length 2 symbols), and the beginning of the PRACH transmission may be aligned with the beginning of the slot. In FIG. 12B, the two transmissions are contiguous (i.e. not separated by a gap), and the beginning of the PRACH transmission is not necessarily aligned with the beginning of the slot. In both FIGS. 12A and 12B, the end of the PUSCH transmission is not necessarily aligned with the end of the slot, although such alignment is possible as shown.

It has been recognized by the inventors that msgA will support HARQ procedures via uplink (UL) grants assigned in part of a Downlink Control Information (DCI) message. However, if the DCI is not received reliably, then the UE will not use the resources allocated in the UL grant and the corresponding PUSCH resources will therefore be wasted. The problem is that, although the RAN infrastructure (e.g. gNB) can make an estimate of the UL quality from the PRACH transmission, the RAN infrastructure cannot readily determine the DL channel quality, particularly for interference-limited cells. As such, DCI may be missed if the transmission procedure is not sufficiently reliable.

To clarify, the DCI contains an UL grant informing the UE how to respond after msgB (which is a combination of messages 2 and 4). If msgB is not received because the RAN infrastructure node (eNB/gNB) has no information upon which to configure the msgB, and an incorrect guess is made, then the UE will not use the UL resources.

Accordingly, embodiments of the present invention comprise including, in a msgA, an indication of DL quality. The UE can transmit this DL quality indicator as part of its msgA in a two-step RACH transmission. Based on the DL quality indicator, the RAN infrastructure can determine a coding scheme for subsequently transmitted downlink control information (DCI) messages. Lower indicated DL quality can result in increased channel allocation for greater reliability. The coding can correspond to channel coding such as introduction of redundancy, transmit power, greater spacing of constellation symbols, or a combination thereof, for example.

It has been specified (for example in the 3GPP work item description document numbered RP-182881 and entitled "New work item: 2-step RACH for NR", 3GPP TSG RAN Meeting #82, Dec. 10-13, 2018) that HARQ should be supported in two-step RACH procedures. As such, DCI is required to support HARQ. The RNTI which a UE can expect to see associated with the DCI may already be specified. However, it has been recognized by the inventors that further definition of what the DCI can contain is required.

Accordingly, embodiments of the present invention comprise including some or all of the following information in DCI, for example as feedback information.

In some embodiments, the DCI includes a UL grant for HARQ retries. In particular, when the PUSCH is not decoded correctly, the RAN infrastructure (e.g. eNB/gNB) may be configured to transmit an UL grant specifying what time and frequency resources the UE is to use to transmit the next HARQ retry.

In some embodiments, the DCI includes a DL grant for a message B (msgB). As used herein, msg, B corresponds to the combination of message 2 and message 4, as transmitted by the RAN infrastructure toward the UE in the two-step RACH procedure. msg. B may include an acknowledgement (ACK). In particular, when the PUSCH is decoded correctly, the RAN infrastructure (e.g. eNB/gNB) may be configured to transmit a DL grant specifying the time and frequency resources the UE is to monitor and process for receiving and decoding msgB. There is not necessarily any need to support a DCI level ACK.

In some embodiments, a negative acknowledgement (NACK) procedure to be performed in association with the two-step RACH procedure is implemented as follows. When the PUSCH is not decoded and it is not clear at the eNB/gNB whether to continue with HARQ, the DCI can include a NACK indication. Upon receiving and detecting the NACK indication, the UE may be configured to make a determination as to whether to retry a two-step RACH procedure, move instead to a (e.g. legacy) four-step RACH, or abort the transmission attempt. Additionally, in some embodiments, the NACK indication may further indicate whether or not the UE should avoid using the two-step RACH procedure in this next determination and/or for a predetermined period of time.

For the 3GPP work item referred to as New Radio Unlicensed (NR-U) spectrum, it is desirable to have continuous transmission in the uplink. Otherwise, if there are gaps in its transmission, a UE may be required to re-perform a listen-before talk (LBT) procedure. The listen time for LBT by competing users of the unlicensed band can be as low as 20 microseconds, therefore even very short transmission gaps may require a UE to re-do the LBT procedure.

As discussed above, some embodiments of the present invention provide for (e.g. variable size) gaps between transmission of a short PRACH preamble and transmission of a following message 3. Also as discussed above, some embodiments of the present invention provide for omission of a DMRS from a message 3. As the DMRS is 1 symbol long, this would result in a 71 microsecond gap for a 15 kHz subcarrier spacing (SCS). As such, transmission is not necessarily continuous.

To facilitate continuous UE transmission in the presence of such gaps, according to some embodiments in which short PRACH preambles are used, a default or sacrificial preamble is defined as one of the 64 possible PRACH preambles (e.g. preamble #1). The UE will randomly choose a PRACH preamble from the remaining set (e.g. #2-#64) and randomly chooses its PRACH preamble transmission occasion (e.g. as one of the six PRACH occasions illustrated in FIG. 8). After the chosen preamble is sent, the UE transmits the sacrificial preamble, for example repeatedly, until the start of the message 3 (PUSCH) transmission. This eliminates a gap in transmission which mitigates the above-identified problem with NR-U LBT. The RAN infrastructure can further be configured to ignore the sacrificial preamble in some embodiments, for example when it is detected as being used after the other PRACH preamble. Although this embodiment is potentially more power-intensive at the UE due to the requirement to eliminate transmission gaps, the advantage of having more than 64 different discernible PRACH preamble signatures (e.g. 7*63=441 signatures when all 7 transmission occasions are available) decreases the probability of preamble collisions and thus increases spectral efficiency.

According to some embodiments, a default or sacrificial DMRS is defined from the 12 possible DMRS symbol patterns (e.g. DMRS pattern #1). For preambles where no DRMS is needed, the eNB will map that preamble pattern to the sacrificial DMRS pattern. For preambles that need DMRS (e.g. poor coverage or high speed), the eNB will map the preamble to a DMRS pattern which is other than the sacrificial DMRS pattern. This mitigates gaps due to omission of the DMRS in message 3. That is, instead of omitting the DMRS pattern as discussed elsewhere herein, the sacrificial DMRS pattern can be transmitted.

In some embodiments, in order to map the two-step RACH resources to a beam, such as a synchronization signal block (SSB), the same approach as is used for the four-step RACH procedure may be used. As beams are time-division multiplexed (TDM), for each beam there is a unique PRACH configuration that is TDM. This is described for example in Section 5.3.4 of 3GPP TS 38.300 and Section 5.1 of 3GPP TS 38.321, "Technical Specification Group Radio Access Network; NR; Medium Access Control (MAC) protocol specification (Release 15)," version 15.4.0, January 2019. In particular, these references describe SSB allocation to the RACH, where a particular SSB is associated with a beam and is used to identify that beam. In NR the gNB transmits a signal first over a narrow angle focused in one direction at one time (referred to a "beam"). The gNB then transmits another beam in another angular direction. This is performed successively for multiple beams, for example progressively in a repeated circular pattern. Each beam is sent with different synchronisation information (SSB) that identifies it.

It is noted that, in currently defined PRACH procedures, power control is open loop. The open loop estimate is based on an indication of Reference Signal Received Power (RSRP) and receive target power and powerrampstep. This is configured as part of the PRACH configuration. In more detail, in Sections 5.1.1, 5.1.3 and 5.1.4 of TS38.321, RSRP is described as a measure of the power of the gNB as received at the UE. As an approximation, the UE can assume that, if it sees a particular power on the downlink, then it can set its uplink transmit power "open-loop" based on this. Thus, for example, a weak incoming signal would cause the UE to transmit RACH with higher power. There are limits on what constitutes the lowest acceptable RSRP. The UE also has discrete steps of power that it can use. If an initial transmission is unacknowledged, the UE steps up to the next power level and tries again. Section 5.1.1 of TS 38.321 describes the parameter preambleReceivedTargetPower: initial Random Access Preamble power, which is the power level to be used by the UE on its first PRACH attempt.

In some embodiments, in order to facilitate power control for the two-step RACH procedure, the following approach can be used.

According to embodiments of the present invention, the configuration parameter set for two-step RACH, referred to as 2StepConfig, includes its own preambleReceiveTargetPower parameter. Alternatively, the corresponding common parameter from a PRACH configuration parameter set can be used. According to embodiments, 2StepConfig additionally or alternatively includes a powerrampstep parameter. Alternatively, the corresponding common parameter from a PRACH configuration parameter set can be used.

In some embodiments, and as mentioned above, the msgA of the two-step RACH procedure includes a channel quality indicator (CQI) indicative of DL quality. This CQI can be provided either as uplink control information (UCI) or in the RLC message.

In some embodiments, the msgA of the two-step RACH procedure includes the UL buffer status (the amount of data UE wants to send). The RAN infrastructure (eNB/gNB) can be configured to transmit an UL grant immediately after msgB if the UL buffer status meets predetermined criteria, such as exceeding a predetermined threshold.

Further embodiments of the present invention related particularly to the 2StepConfig parameter set are described below.

In various embodiments, a 2stepConfig parameter set is used to define and convey all the configuration information a UE uses to transmit using the two-step RACH procedure. In some embodiments, the 2StepConfig parameter set is included in wirelessly transmitted system information similar to the PRACH configuration. In some embodiments, the 2StepConfig parameter set is included in one or more UE specific RRC messages (e.g. RRCReconfiguration message). The 2stepConfig parameters may thus be transmitted over-the-air to a UE for use thereby.

The 2StepConfig parameter set may include parameters indicative of some or all of the following:
  Scenario Type (e.g. speed, RRC state);
  Coverage range (e.g. RSRP/RSRQ);
  PUSCH T/F resource and periodicity;
  PRACH T/F resource and periodicity;
  PRACH preambles;
  PRACH format and # of slots/occasions;
  Start RNTI range (i.e. the start of the range);

HARQ Timeout;
Transport block size(S)—blind decoding possible;
Power offset between PRACH and PUSCH; and
DMRS to PRACH preamble mapping.

Various embodiments of the present invention comprise or relate to use of a particular 2StepConfig parameter set, or equivalent specification of parameters. The parameter set may be characterized in one or both of: the parameters specified, and the values or ranges of values for such parameters. Use of a parameter set may include one or more of generating the parameter set, transmitting the parameter set, receiving the parameter set, and configuring operations based on the content of the received parameter set. Generating the parameter set may be based on input such as indications of current network conditions. The operations can include wireless transmission and reception operations, for example by a UE and including operations of a two-step RACH procedure.

In some scenarios, power needed to decode signals transmitted via PRACH might be lower or higher than power needed to decode signals transmitted via PUSCH. Accordingly, in some embodiments of the present invention, RAN infrastructure (gNB) may be configured to specify a transmit power offset between PRACH and PUSCH in the 2StepConfig parameter set. Open loop power control may still be used for an initial PRACH transmission.

The power offset between PRACH and PUSCH parameter may be specified and used in coordination with this embodiment.

In some scenarios, it may be unclear how to efficiently pack PRACH/PUSCH when different PRACH formats are used for different 2stepConfigs. Thus the PRACH time and frequency (T/F) resources should not overlap.

To mitigate this, in some embodiments, independent PUSCH/PRACH T/F time alignment may be used. The PRACH formats for each 2stepconfig may be TDM'd before the PUSCH. The PUSCH of the different configurations can share the same T/F resources. This may create a large gap between some PRACH preamble transmissions and their corresponding PUSCH transmissions which may require either specific configuration, signalling or a flexible approach to decoding.

Time alignment may refer to the relative timing of the PRACH and PUSCH, which may not be as shown in all the diagrams so far. For example, PRACH and PUSCH are not necessarily transmitted in contiguous slots. Rather, some of the PRACH transmissions may be scheduled much further in advance of their associated PUSCH transmissions, particularly if PUSCH is shared simultaneously by many UEs. In this case there may be a gap (e.g. on the order of several slots) between PRACH (msg1) and PUSCH (msg3) transmissions of the 2-step RACH procedure. An example of this situation is illustrated in FIG. 10B.

To support this, in some embodiments, the 2stepConfig parameter set is configured to allow the PRACH T/F resources and PUSCH T/F resource to be separately (e.g. independently) specified. For example, the parameter set may include different parameter fields for each of these different resources.

The PUSCH T/F resource and periodicity parameter, and the PRACH T/F resource and periodicity parameter may be specified and used in coordination with this embodiment.

Some embodiments of the present invention provide support for UEs with different coverage levels. This may include having different 2StepConfig parameter set possibilities (e.g. specifying different parameters for different UEs and/or coverage levels). In some embodiments, the configurations corresponding to the different parameter set possibilities support different modulation and coding schemes (MCS) for coding of PUSCH. Accordingly, T/F and TBS size may be specified in the 2StepConfig parameter set. For example, parameter set possibilities for different levels of coverage can be specified, and each UE can determine their coverage and thus the appropriate parameter set to use.

In some embodiments, because short PRACH preambles are considered to be more efficient for good coverage, and long PRACH preambles are considered to provide more coverage for cell edge coverage, the configuration parameters in 2StepConfig may specify the PRACH preamble format, e.g. whether short or long PRACH preambles are to be used, for a given coverage level. In some embodiments, if the coverage level doesn't require the capacity offered by using all the PRACH preambles, a sub-range of PRACH preambles to be used may be indicated in the 2stepConfig parameter set.

In some embodiments, the configuration parameters may indicate one or more coverage levels corresponding to one or more parameter set options. The coverage levels may be indicated as ranges of RSRP values. A UE is then configured to determine which 2StepConfig parameter set to use by comparing its observed RSRP value to the provided ranges. The parameter set corresponding to the range into which the observed RSRP value is then selected for use.

The PUSCH T/F resource and periodicity parameter, and the PRACH T/F resource and periodicity parameter may be specified and used in coordination with this embodiment. The coverage range parameter may be specified and used in coordination with this embodiment. The PRACH preamble parameter, and the PRACH format and # of slots/occasion parameter may be specified and used in coordination with this embodiment.

In some coverage limited scenarios where relatively larger transport block sizes (TBS) are used, the PUSCH T/F resources might need to be larger than the PRACH T/F resource allocations. It is considered that, if the PRACH is used for channel estimation of the PUSCH, the channel estimation only strictly applies to the frequency range spanned by the PRACH, which then limits the reliably usable (estimable) PUSCH frequency range.

Accordingly, in some embodiments of the present invention, the PUSCH frequency range is made a predetermined (e.g. limited) amount larger than the PRACH frequency range. For the following discussion, it is considered that coherence Bandwidth=1/Delay spread and Delay spread=distance between delayed signals/speed of light. For example, a 1.4 km multipath corresponds to a 212 kHz coherent bandwidth. Therefore, given a PRB that is 180 kHz wide the PUSCH may be configured to extend about 1 PRB, i.e. about 180 kHz, beyond the frequency band used by the PRACH. For mmWAVE applications (the NR Frequency Range 2 (FR2—above 6 GHz)) in which multipath is less pronounced, the PUSCH may extend farther past the PRACH frequency range. For example, the PUSCH may be configured to extend by 2 or more PRBs (on either side, i.e. about 360 kHz) for a wide area (macro cell) in NR Frequency Range 1 (FR1—up to 6 GHz) before this would degrade the channel estimate. The PUSCH may also be extended in time, for example beyond 1 ms or it may be shorter than the preamble length. To allow for this, the 2stepConfig parameter set may be configured to allow the PRACH and PUSCH T/F locations to be independently specified.

As will be readily understood, the expected multipath delay spread is dependent on the cell size and the environment in terms of numbers of reflectors and distances between them and the e/gNB and the UE. There are a number of established models for multipath delay which are applicable to different cell environments, such as urban, suburban and rural environments.

The PUSCH T/F resource and periodicity parameter, and the PRACH T/F resource and periodicity parameter may be specified and used in coordination with this embodiment.

HARQ is expected to be supported for two-step RACH. However, it is not yet clear how the RNTI is to be defined and used and how the UE is to know when HARQ has failed, when to perform a HARQ retry, and under what conditions the RNTI becomes invalid.

Accordingly, in embodiments of the present invention, a start RNTI range may be employed. In such embodiments, the UE is configured to determine the RNTI by: obtaining a "start RNTI range" from the 2stepconfig parameter set; and then determining the RNTI based on which PRACH preamble length (e.g. long or short) and/or PRACH transmission occasion the UE selects (e.g. randomly). Selection of PRACH preamble length and selection of a PRACH transmission occasion to use out of multiple PRACH transmission occasions is specified elsewhere herein.

The above determination may be described by the following equation: RNTI=start RNTI range+PRACH preamble length*PRACH transmission occasion.

Additionally or alternatively, in embodiments of the present invention, a HARQ timeout may be employed. It is useful for the UE to know when the HARQ process has been terminated so that the UE can retry the transmission or stop listening for the anticipated RNTI, in order to save power. The termination of the HARQ process may be indicated via signalling. However, if the HARQ process is ongoing, it may be because the communication path is compromised or challenging, so the signalling would not be received. If there is an agreed maximum HARQ timeout before the HARQ is started, both UE and gNB will know when the HARQ process has terminated without the need for UE specific signalling.

In some scenarios, RNTI ranges will be re-used at different times. Preferably, the re-use time may be short, so the re-use can be as often as possible. However, if the time is too short, then the HARQ retries will be limited. If the time is too long, more RNTIs will be required to be allocated. Specifying the HARQ timeout provides that the RNTIs will no longer be used after this time and the gNB can safely re-farm/re-use the RNTI e.g. for another 2StepConfig parameter set.

The Start RNTI range parameter, and the HARQ timeout parameter may be specified and used in coordination with this embodiment.

In some scenarios, the 2step RACH procedure is only used for signalling, and not for user data. However, the size of the signalling packet may vary for different scenarios (e.g. RRC_inactive, RRC_connected and RRC_idle states).

Accordingly, embodiments of the present invention provide an approach for handling different transport block sizes (TBS). In some embodiments, the TBS is specified in the 2StepConfig parameter set. Further, one configuration per scenario (e.g. RRC_inactive, RRC_connected and RRC_idle states) is specified. An indication of which scenario a given parameter set is for is also provided, e.g. within the parameter set.

Alternately, the gNB may make a determination to perform some blind decoding and a single configuration (e.g. defined as one of several possibilities in the 2StepConfig parameter set) can be used to support multiple TBS sizes for multiple scenarios. Accordingly, in some embodiments an indication (e.g. list) of multiple applicable TBS can be specified in the 2StepConfig parameter set, so that the parameter set is usable for any of these TBS.

The Scenario Type parameter and the Transport Block Size parameter may be specified and used in coordination with this embodiment.

It is considered that some of the possibilities in the 2StepConfig parameter set may specify large gaps between PRACH and PUSCH. This may not be particularly desirable or effective for high speed scenarios.

Accordingly, in some embodiments, the 2stepconfig parameter set indicates if it is applicable to be used for high speed scenarios or not. For example, the high speed scenario may be restricted to mitigate or eliminate large gaps between PRACH and PUSCH transmissions. Additionally or alternatively, the configuration should be such that the DMRS has lower than a threshold probability of collision.

The Scenario Type parameter may be specified and used in coordination with this embodiment.

Embodiments of the present invention provide an approach for mapping the PRACH preamble to the DMRS. This mapping may be specified in the 2stepconfig parameter set. In some embodiments, the ratio of PRACH/DMRS is desirably lower for deep coverage, thus making DMRS collisions less likely. In some embodiments, when fewer than all of the PRACH preambles are used, the ratio of PRACH/DMRS may be configured so that it is lower, thus making DMRS collisions less likely. In some embodiments, the number of orthogonal PRACH preambles depends on the number of PRACH preamble transmission occasions. As such, if there are more PRACH preambles, the ratio of PRACH/DMRS is expected to be higher.

The DMRS to PRACH preamble mapping parameter may be specified and used in coordination with this embodiment.

Alternatively, the mapping of the DMRS to the PRACH preambles can be prescribed (e.g. in the standards specification), rather than in the 2StepConfig parameter set. In this case, signalling is not required to specify this mapping. For example, assuming 16 PRACH preambles and 4 DMRS, the mapping of PRACH preambles to DMRS can be specified as in Table 1.

TABLE 1

| Preamble | DMRS |
| --- | --- |
| 1 | 1 |
| 2 | 2 |
| 3 | 3 |
| 4 | 4 |
| 5 | 1 |
| 6 | 2 |
| 7 | 3 |
| 8 | 4 |
| 9 | 1 |
| 10 | 2 |
| 11 | 3 |
| 12 | 4 |
| 13 | 1 |
| 14 | 2 |
| 15 | 3 |
| 16 | 4 |

In an example embodiment, the 2stepconfig parameter set for deep coverage cases allocates preambles 1-4 which have no chance of DMRS collisions. The 2StepConfig parameter set for good coverage would allocate preambles 1-16 which have a chance of DMRS collisions but with more preambles resulting in more capacity.

Embodiments of the present invention are configured to incorporate hybrid automatic repeat request (HARQ) support with the two-step RACH procedure, as described in more detail below.

The benefits of HARQ are known and warrants the consideration for support in the two-step RACH procedure. With the 4-step RACH procedure as defined in 3GPP Release 15, the gNB can resend the random access response (RAR) if it fails to decode msg3. According to embodiments of the present invention, in the case of the two-step RACH procedure, if the gNB is able to detect the preamble part of MsgA but is unable to decode the PUSCH part of MsgA, the gNB may use HARQ to trigger a repeat transmission attempt. Considering the uncertainty in decoding the MsgA PUSCH, it is considered by the inventors that supporting HARQ retransmissions in MsgA can be significantly beneficial.

According to some embodiments, the gNB is configured to request the UE to retransmit the PUSCH part for the HARQ retries. This is similar to triggering message 3 (msg3) retransmissions. Alternatively, the gNB may be configured to fall back to a four-step RACH procedure. This may be implemented by sending a RAR, so that the UE is prompted to send a message 3. In this case, the gNB would need to support HARQ including the first PUSCH.

Accordingly, embodiments of the present invention provide for a 2-step RACH procedure (and associated methods and apparatus) that is configured to support HARQ in case of PUSCH decoding failure in MsgA. For example, upon failing to decode the PUSCH portion of MsgA, the RAN infrastructure (gNB) can initiate a HARQ operation.

In some embodiments, the two-step RACH procedure has a RACH configuration similar to four-step RACH, that can be either broadcasted or included as part of UE-specific RRC messages. However, for the two-step RACH procedure, multiple configurations (or groups) may be included to allow for more adaptation for the UE coverage levels and message sizes. It is noted that the two-step RACH procedure may not have a RAR for scheduling the PUSCH resources during the RACH procedure.

Figure 13:
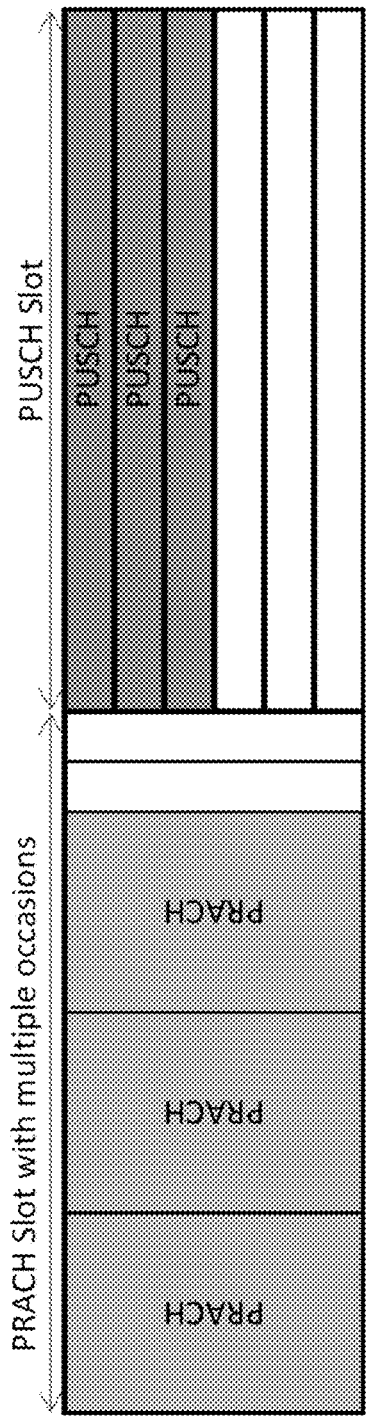
FIG. 13 illustrates an example two-step RACH configuration used in a good UE coverage situation, according to embodiments of the present invention.
Figure 14:
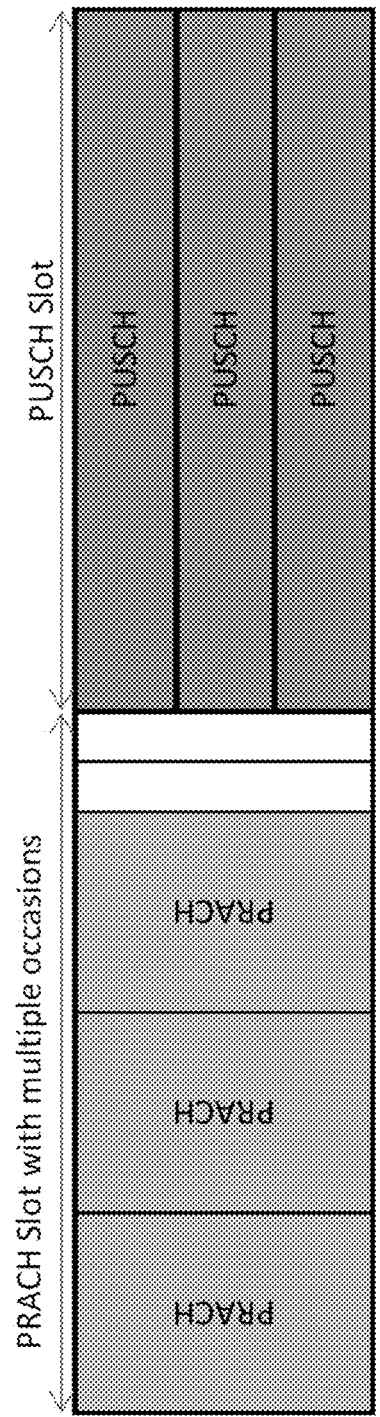
FIG. 14 illustrates an example two-step RACH configuration used in a poor UE coverage situation, according to embodiments of the present invention.

In some embodiments, different ones of these multiple configurations may have different PUSCH modulation and coding scheme (MCS), PUSCH resource allocation, PRACH formats, power control/ramping sets, etc. The UE may then select a suitable one of the multiple configurations based at least in part on the measured RSRP (for example) so that it uses only the resources that are required for the coverage level. For example, when the UE is in good coverage, it may select a configuration that maps to smaller PUSCH resources, as shown in FIG. 13. As another example, if the UE is in poor coverage it may use a configuration that maps to larger PUSCH resources, as shown in FIG. 14. Similarly, the 2-step RACH configuration may use different PRACH formats to better match the UE coverage level.

Accordingly, embodiments of the present invention provide support for multiple two-step RACH configurations. Each of the multiple configurations may specify one, some or all of: one or more coverage range thresholds (e.g. RSRP/RSRQ ranges); one or more PUSCH modulation and coding schemes for use in the two-step RACH transmission; and at least one PRACH format usable in the two-step RACH transmission. The number of two-step RACH configurations may be determined based on a variety of design factors.

Additional information relevant to embodiments of the present invention is provided below.

A relevant 2-Step RACH Work Item Description (WID) can be found at http://www.3gpp.org/ftp/tsg_ran/TSG_RAN/TSGR_82/Docs/RP-182881.zip, which is hereby incorporated by reference. The objectives in Section 4.1 of the above document can be considered to be relevant.

Figure 15:
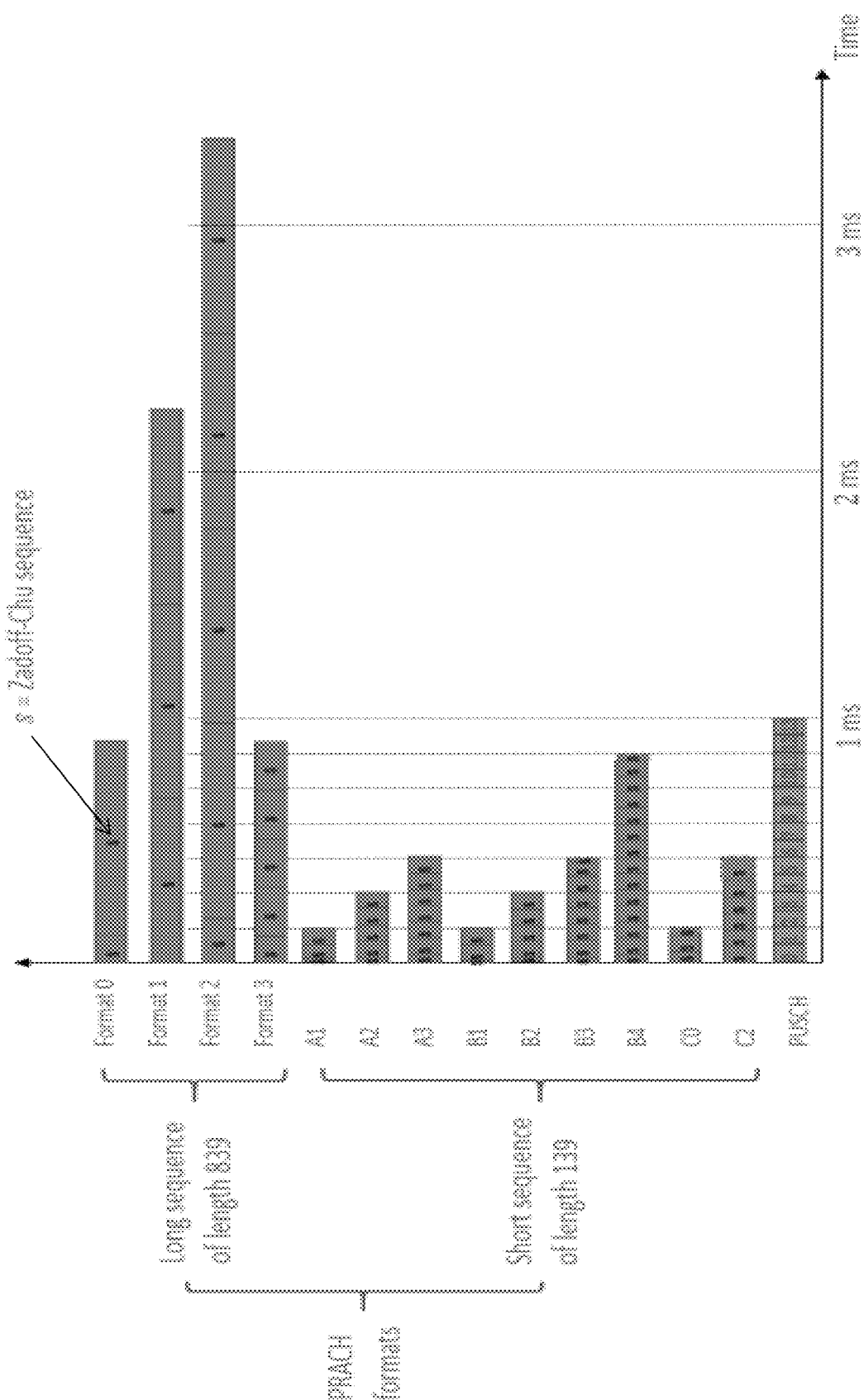
FIG. 15 illustrates PRACH formats using Long and Short sequences, in accordance with embodiments of the present invention.

Two main types of PRACH format, namely Long and Short, are typical. The long sequence has length L=839 and is typically used only for frequencies less than 6 GHz. Subcarrier spacing and bandwidth may be specified as 1.25 kHz (1.25 MHz) and 5 kHz (5 MHz). The short sequence has length L=139 and is intended for frequencies greater than 6 GHz (e.g. for beam-sweeping operation). The short sequence however can be used for frequencies both below and above 6 GHz. Subcarrier spacing and bandwidth may be specified, for frequencies below 6 GHz, as 15 kHz (2.5 MHz) and 30 kHz (5 MHz). Subcarrier spacing and bandwidth may be specified, for frequencies above 6 GHz, as 60 kHz (10 MHz) and 120 kHz (20 MHz). FIG. 15 illustrates PRACH formats using Long and Short sequences.

The number of DMRS symbols in a PDSCH/PUSCH duration may be configured. This enables support for very high UE mobility, but also low DMRS overhead when the scenario allows.

NR DMRS may support massive multi-user MIMO. In some cases, it can be beamformed and can support up to 12 orthogonal layers. As mentioned previously, the DMRS sequence for CP-OFDM is QPSK based on Gold sequences. For PUSCH with DFT-S-OFDM there is also a low PAPR Zadoff-Chu mode.

In some cases, there are 127 PRACH root sequences for short and 838 for long PRACH preambles. However, only a maximum of 64 orthogonal preamble signatures may be available for both long and short PRACH preambles. This limitation may be due to a desire to incorporate cyclic shifts when dealing with larger propagation and delay spreads, to facilitate uniqueness. Section 6.3.3.1 of TS 38.211, describes sequence generation, stating that "[t]here are 64 preambles defined in each time-frequency PRACH occasion, enumerated in increasing order of first increasing cyclic shift $C_v$ of a logical root sequence, and then in increasing order of the logical root sequence index, starting with the index obtained from the higher-layer parameter prach-RootSequenceIndex. Additional preamble sequences, in case 64 preambles cannot be generated from a single root Zadoff-Chu sequence, are obtained from the root sequences with the consecutive logical indexes until all the 64 sequences are found. The logical root sequence order is cyclic; the logical index 0 is consecutive to 837 when $L_{RA}$=839 and is consecutive to 137 when $L_{RA}$=139. The sequence number is obtained from the logical root sequence index according to Tables 6.3.3.1-3 and 6.3.3.1-4."

In current implementations, a UE may randomly select a time domain PRACH occasion within a PRACH slot. Other UEs may randomly select from remaining parts of the slot.

In current implementations, each BWP can have different prach-ConfigIndex. An initial BWP is defined in ServingCellConfigCommonSIB which may have two PRACH configs. One for the common band and one for the SUL band (if supported):

uplinkConfigCommon    UplinkConfigCommonSIB OPTIONAL,
supplementaryUplink    UplinkConfigCommonSIB OPTIONAL, ServingCellConfigCommonSIB is sent in SIB1. SIB1 is inside the RMSI which is scheduled by the initial CORSET for the initial BWP. The CORSET is defined by the SSB.

According to some embodiments, there is provided a method for channel estimation by a radio access network (RAN) infrastructure node, the method comprising receiving, as part of a two-step random access channel (RACH) access procedure, a combination of a message 1 plus a message 3 from a UE, wherein a short PRACH preamble of the message 1 is separated from a start of the message 3 by a variable length gap; and estimating channel conditions using characteristics of at least one the message 1 and the message 3.

According to some embodiments, there is provided a method for performing a two-step RACH procedure by a UE, the method comprising including a downlink quality indicator within one or more messages transmitted by the UE as part of the two-step RACH procedure.

According to some embodiments, there is provided a two-step RACH procedure, the method comprising: providing multiple configurations for the two-step RACH procedure; selecting one of the multiple configurations; and performing the two-step RACH procedure using parameters in the selected one of the multiple configurations. In some embodiments, each of the multiple configurations specifies: one or more coverage range thresholds; one or more PUSCH modulation and coding schemes; and a PRACH format. In some embodiments, the method further comprises selecting, by a UE, one of the multiple configurations based at least in part on a measured received signal received power (RSRP) level.

According to some embodiments, there is provided a method for performing a two-step RACH procedure, the method comprising transmitting, by a user equipment (UE), a message 1 of the two-step RACH procedure at least partially using a predetermined slot; and transmitting, by the UE, a message 3 of the two-step RACH procedure at least partially using the same predetermined slot. In some embodiments, the message 1 comprises a PRACH preamble transmitted at one of a set of one or more PRACH preamble transmission occasions within the predetermined slot. In some embodiments the message 1 and the message 3 are both entirely contained within the predetermined slot.

Various embodiments of the present invention may be implemented as a computer-implemented method, namely a method whose steps are implemented by computing devices such as by a combination of LTE network infrastructure devices such as eNBs or related infrastructure equipment as well as LTE wireless terminal UEs such as MTC UEs or other UEs. The method may thus be implemented in a distributed manner. The computing devices may implement the method by executing, by a processor (e.g. microprocessor), computer instructions stored in memory and operating various electronics associated with and controlled by the computing devices accordingly. Additionally or alternatively, some or all of the operations of the computing devices may be executed by electronics executing firmware instructions or dedicated electronics hardware configured to operate in a predetermined manner when presented with predetermined patterns of electronic inputs. In particular, a processor executing instructions stored in memory can be replaced, in some embodiments, with other electronic components (e.g. comprising FPGAs, ASICs, etc.) which perform the same function.

Various embodiments of the present invention may correspond to a system comprising a combination of LTE network infrastructure devices such as eNBs or related infrastructure equipment as well as LTE wireless terminal UEs such as MTC UEs or other UEs. The system may be described in terms of interacting modules, wherein each module corresponds to a selection of electronic components operating together to produce an effect. It should also be understood that embodiments of the present invention provide for a UE, a base station, or a system comprising same, which are configured to operate in accordance with one or a combination of the methods described herein.

Figure 16:
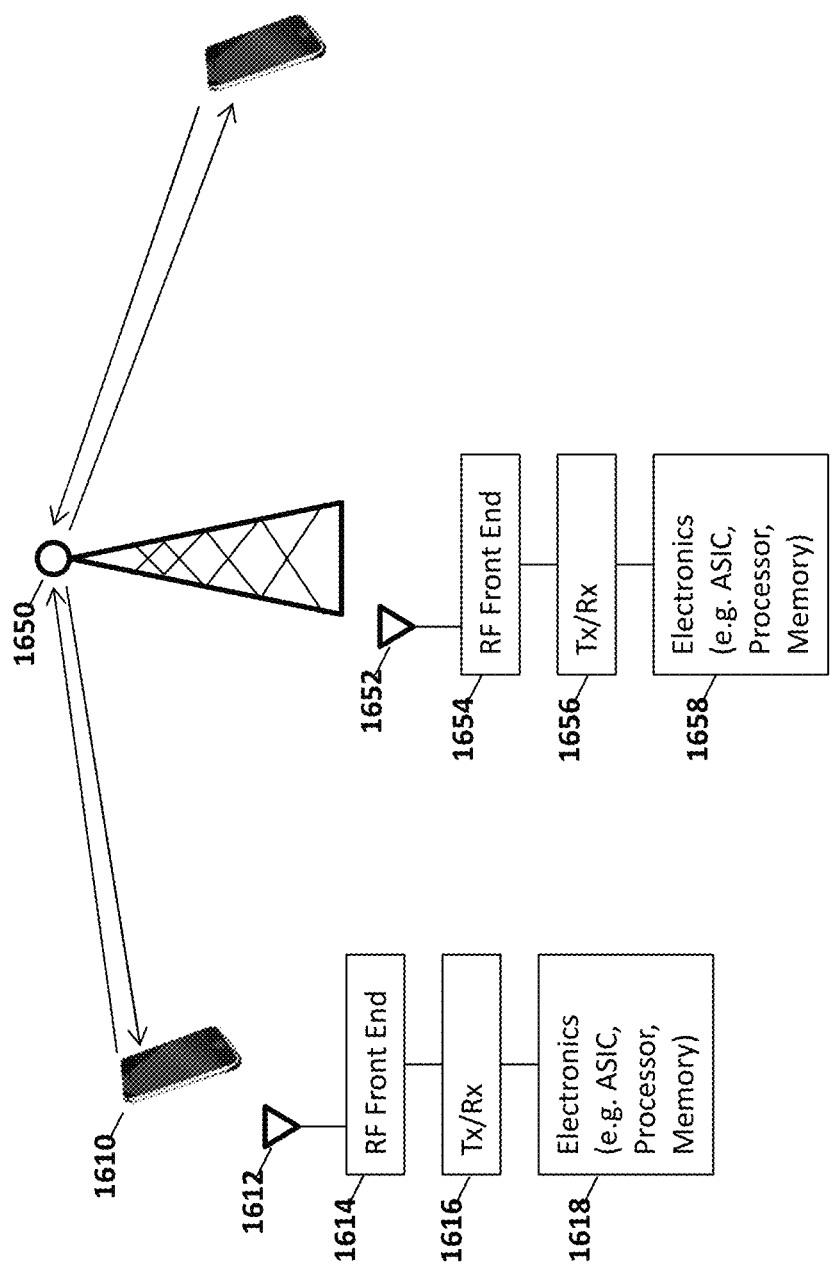
FIG. 16 illustrates a UE and a RAN infrastructure device (e.g. eNB, gNB) of a wireless communication network, in accordance with embodiments of the present invention.

FIG. 16 illustrates a UE 1610 and a RAN infrastructure device 1650 (eNB/gNB) of a wireless communication network, in accordance with an embodiment of the present invention. The UE 1610 includes an antenna 1612, a RF Front end 1614, a RF transmitter and receiver 1616, and supporting electronics 1618 such as but not necessarily limited to: digital circuitry such as application specific integrated circuits (ASIC), a computer processor and a memory. The memory can include program instructions for execution by the processor in order to cause the UE 1610 to operate as described herein, for example to perform the methods described previously. The RAN infrastructure device 1650 similarly includes an antenna 1652, a RF Front end 1654, a RF transmitter and receiver 1656, and supporting electronics 1658 such as but not necessarily limited to: digital circuitry such as application specific integrated circuits (ASIC), a computer processor and a memory. The memory can include program instructions for execution by the processor in order to cause the RAN infrastructure device 1650 to operate as described herein, for example to perform the methods described previously.

It will be understood that the term "RAN infrastructure device" "base station" or "base transceiver station (BTS)" may refer to an evolved NodeB (eNB), New Radio (NR) or next generation NodeB (e.g. gNodeB or gNB), a radio access node, or another device in a wireless communication network infrastructure, such as an LTE infrastructure, which performs or directs at least some aspects of wireless communication with wireless communication devices. The term "terminal" or "UE" refers to a device, such as a mobile device, MTC device, or other device, which accesses the wireless communication network infrastructure via wireless communication with a base station.

It will be appreciated that, although specific embodiments of the technology have been described herein for purposes of illustration, various modifications may be made without departing from the scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method for performing a two-step random access channel (RACH) procedure, the method comprising:
    transmitting, by a user equipment (UE), a physical RACH (PRACH) preamble in a PRACH slot within a first time range spanning a first frequency range and transmitting, by the UE, after a time gap, a physical uplink shared channel (PUSCH) message in one or more PUSCH slots within a second time range spanning a second frequency range wherein the PRACH preamble is selected from a set of PRACH preambles, the PUSCH message includes a demodulation reference signal (DMRS) symbol pattern from a set of DMRS symbol patterns;
    wherein one or more of the first frequency range, the first time range, the time gap, the second time range, and the second frequency range are signaled in a parameter set; and
    wherein the parameter set includes one or more of PRACH preamble sequences, PRACH formats, power offset, a receive target power of the PRACH preamble and a power ramp step for PRACH preamble.

2. The method of claim 1, wherein the PUSCH message can be one or more of frequency division multiplexed (FDM) and time division multiplexed (TDM).

3. The method of claim 1, wherein the parameter set is broadcasted to the UE.

4. The method of claim 1, wherein the parameter set is included in one or more UE specific radio resource control (RRC) messages.

5. The method of claim 1, wherein the UE is signaled to fall back to a 4-step RACH procedure by a base transceiver station (BTS) sending a fallback random access response (RAR) message.

6. The method of claim 5, wherein in response to the UE receiving the fallback RAR message, the UE sends message 3 of the 4-step RACH procedure.

7. The method of claim 1, wherein the UE listens for a period of time for a response to the PUSCH message.

8. The method of claim 7, wherein the period of time is signaled.

9. The method of claim 1, wherein each member of the set of DMRS symbol patterns is associated with multiple members of the set of PRACH preambles.

10. The method of claim 1, wherein multiple PRACH occasions within one slot are mapped to multiple PUSCH resources over one or more slots.

* * * * *